United States Patent
Muir et al.

(10) Patent No.: US 6,893,595 B1
(45) Date of Patent: May 17, 2005

(54) METHOD FOR PROVIDING COATED MOULDED POLYMERIC ARTICLES

(75) Inventors: Andrew Victor Graham Muir, Surrey (GB); Paula Frances Lennon, Paris (FR); Sean Leo Willis, Surrey (GB); Richard Paul Redman, Surrey (GB); Anthony Claude Marie Collias, Surrey (GB)

(73) Assignee: Biocompatibles UK Limited, Farnham (GB)

( * ) Notice: Subject to any disclaimer, the term of this patent is extended or adjusted under 35 U.S.C. 154(b) by 0 days.

(21) Appl. No.: 09/743,397

(22) PCT Filed: Jul. 19, 1999

(86) PCT No.: PCT/GB99/02320

§ 371 (c)(1),
(2), (4) Date: May 4, 2001

(87) PCT Pub. No.: WO00/04078

PCT Pub. Date: Jan. 27, 2000

(30) Foreign Application Priority Data

Jul. 17, 1998 (EP) .............................................. 98305748

(51) Int. Cl.⁷ ........................... B29C 39/12; B29D 11/00
(52) U.S. Cl. ........................................ 264/255; 264/1.7

(58) Field of Search .......................... 264/1.1, 1.7, 255, 264/261, 331.18, 331.11

(56) References Cited

U.S. PATENT DOCUMENTS

| 4,208,362 A | 6/1980 | Deichert et al. ................ 264/1 |
| 4,544,572 A | 10/1985 | Sandvig et al. ................ 427/44 |
| 5,010,155 A | 4/1991 | Mueller ...................... 527/301 |

FOREIGN PATENT DOCUMENTS

| EP | 0 207 640 | 1/1987 | ........... B29D/11/00 |
| EP | 0 352 134 | 1/1990 | ........... B29D/11/00 |
| EP | 0 908 476 | 4/1999 | ......... C08F/216/06 |
| WO | 93/01221 | 1/1993 | ......... C08F/246/00 |
| WO | 93/05081 | 3/1993 | ............. C08F/8/40 |

*Primary Examiner*—Mathieu D. Vargot
(74) *Attorney, Agent, or Firm*—Sughrue Mion, PLLC

(57) ABSTRACT

A method in which a mould is coated with a reactive polymer, a liquid curable composition is filled into the mould and cured under conditions such that the reactive polymer becomes covalently bonded to the cured bulk mould material at the interface. The reactive polymer has zwitterionic groups to confer improved biocompatibility on the moulded product. The reactive group on the reactive polymer is conveniently an ethylenically unsaturated group. The curable composition is suitably a radical polymerisable ethylenically unsaturated monomer mixture or a platinum-curable liquid silicone composition.

19 Claims, No Drawings

METHOD FOR PROVIDING COATED MOULDED POLYMERIC ARTICLES

The present invention relates to processes for making coated moulded polymeric articles, in which the coating is firmly adhered to the product and provides an article having different surface properties to the properties of the bulk.

It is frequently desirable to impart to the surface of a polymeric article properties different to the bulk. For instance it is often desirable to provide a hydrophobic bulk polymer with a hydrophilic surface, or visa versa. Alternatively it may be desirable to stabilise the surface of a relatively lightly crosslinked polymer by providing a relatively more highly crosslinked surface coating.

In our earlier application no. WO-A-93/01221 we described coatings for polymeric substrates, formed of polymers with zwitterionic pendant groups. The polymers provide the substrate with improved biocompatibilty and haemocompatibility. The polymers may be hydrophobically adsorbed onto the surface, or may be ionically linked to the surface or, preferably, may be stabilised on the surface by provision of covalent bonding between surface functional groups and reactive groups on the polymer reactive therewith. Similar copolymers may be crosslinkable after coating, for instance by post-coating exposure to conditions whereby intermolecular crosslinking takes place. One example of a reactive group is provided by an ethylenically unsaturated group in a monomer from which the copolymer is formed. Such ethylenically unsaturated groups may be crosslinked in a intermolecular addition reaction between the ethylenically unsaturated groups of adjacent polymer chains. Alternatively the ethylenically unsaturated pendant group may be reacted with surface functional groups to provide a covalent bond with the substrate surface.

In our earlier application no. WO-A-93/05081 a polymeric substrate is provided with surface zwitterionic groups by grafting, for instance graft (co) polymerisation, of a compound bearing a zwitterionic group.

Both the above approaches to provision of covalently bonded coatings having zwitterionic groups require the provision of a substrate having surface functional groups. Where the starting material is substantially non-functional, it may be necessary to activate the surface, for instance by using an oxygen plasma pre-treatment step, to provide functional groups prior to the coating or grafting step. Alternatively it may be possible to adapt the material of the substrate, during production, to introduce surface functional groups. However where the product is made in a polymerisation stage, it will be necessary to carry out the polymerisation under conditions such that the functional groups are not de-activated. This may make the curing/polymerisation process more complex, since it is generally necessary to subject the bulk material to relatively extreme conditions to ensure polymerisation throughout the bulk.

In EP-A-0362137 bulk hydrophobic substrates are provided with an integral hydrophilic surface layer by a process in which the surface of the mould is provided with a coating of a coating polymer A having pendant reactive groups, a liquid curable composition comprising a co-reactive compound is used to fill the mould, whereby the curable compositions is in contact with the coated portions of the mould surface, and the curable composition is cured to form bulk polymer B under conditions such that the reaction takes place between the said co-reactive compound and the reactive group of polymer A to form a covalent bond linking polymer A to polymer B at least at the interface between the coating and bulk polymer B. The coating polymer A may, for instance, include pendant vinylic groups. These may be reactive with ethylenically unsaturated groups in the curable composition or may react with hydrosilyl groups in a curable silicone composition. Hydrophilicity of the coating polymers is provided by ionic groups, or by poly (ethylene oxide) groups.

In a new method according to the invention providing a coated moulded polymer article the following steps are carried out:
 a) a least a portion of the surface of a mould is provided with a coating of polymer A having pendant reactive groups;
 b) a liquid curable composition comprising a functional compound reactive with the reactive group of polymer A is contacted with the mould whereby the composition is in contact with the portion of the mould surface coated with polymer A;
 c) the curable composition is cured to form bulk polymer B under conditions such that reaction takes place between the functional compound and the reactive group of polymer A to form a covalent bond linking polymer A to polymer B at least at the interface between the said coating and bulk polymer B, the method being characterised in that polymer A comprises zwitterionic groups X.

In the polymer A, the zwitterionic groups X each include an anionic group as well as a cationic group. Preferably the groups X are pendant groups, that is which are pendant from the backbone of the polymer. In group X, the atom bearing the cationic charge and the atom bearing the anionic charge are generally separated by 2 to 12 atoms, preferably 2 to 8 atoms, more preferably 3 to 6 atoms, generally at least 2 carbon atoms.

Preferably the cationic group in zwitterionic group X is an amine group, preferably a tertiary amine or, more preferably, a quaternary ammonium group. The anionic group in X may be a carboxylate, sulphate, sulphonate, phosphonate, or more preferably, phosphate group. Preferably the zwitterionic group has a single monovalently charged anionic moiety and a single monovalently charged cationic moiety. A phosphate group is preferably in the form of diester.

Preferably, in a pendant group X, the anion is closer to the polymer backbone than the cation.

Alternatively group X may be a betaine group (ie in which the cation is closer to the backbone), for instance a sulpho-, carboxy- or phospho-betaine. A betaine group should have no overall charge and is preferably therefore a carboxy- or sulpho-betaine. If it is a phosphobetaine the phosphate terminal group must be a diester, i.e., be esterified with an alcohol. Such groups may be represented by the general formula II

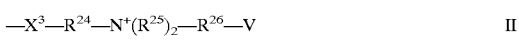

$$-X^3-R^{24}-N^+(R^{25})_2-R^{26}-V \qquad II$$

in which $X^3$ is a valence bond, —O—, —S— or —NH—, preferably —O—;

V is a carboxylate, sulphonate or phosphate (diester-monovalently charged) anion;

$R^{24}$ is a valence bond (together with $X^3$) or alkylene-C(O)alkylene- or —C(O)NHalkylene preferably alkylene and preferably containing from 1 to 6 carbon atoms in the alkylene chain;

the groups $R^{25}$ are the same or different and each is hydrogen or alkyl of 1 to 4 carbon atoms or the groups $R^{25}$ together with the nitrogen to which they are attached form a heterocyclic ring of 5 to 7 atoms; and $R^{26}$ is alkylene of 1 to 20, preferably 1 to 10, more preferably 1 to 6 carbon atoms provided that when V is a sulphonate anion, $R^{26}$ is alkylene of 6 or more carbon atoms.

One preferred sulphobetaine monomer has the formula III

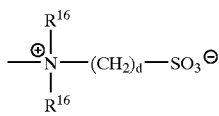

where the groups $R^{16}$ are the same or different and each is hydrogen or $C_{1-4}$ alkyl and d is from 2 to 4.

Preferably the groups $R^{16}$ are the same. It is also preferable that at least one of the groups $R^{16}$ is methyl, and more preferable that the groups $R^{16}$ are both methyl.

Preferably d is 2 or 3, more preferably 3.

Alternatively the group X may be an amino acid moiety in which the alpha carbon atom (to which an amine group and the carboxylic acid group are attached) is joined through a linker group to the backbone of polymer A. Such groups may be represented by the general formula IV

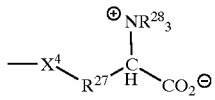

in which $X^4$ is a valence bond, —O—, —S— or —NH—, preferably —O—, $R^{27}$ is a valence bond (optionally together with $X^4$) or alkylene, —C(O)alkylene- or —C(O)NHalkylene, preferably alkylene and preferably containing from 1 to 6 carbon atoms; and the groups $R^{28}$ are the same or different and each is hydrogen or alkyl of 1 to 4 carbon atoms, preferably methyl, or two of the groups $R^{28}$, together with the nitrogen to which they are attached, form a heterocyclic ring of from 5 to 7 atoms, or the three group $R^{28}$ together with the nitrogen atom to which they are attached form a fused ring structure containing from 5 to 7 atoms in each ring.

X is preferably of formula V

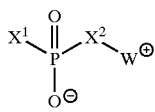

in which the moieties $X^1$ and $X^2$, which are the same or different, are —O—, —S—, —NH— or a valence bond, preferably —O—, and $W^+$ is a group comprising an ammonium, phosphonium or sulphonium cationic group and a group linking the anionic and cationic moieties which is preferably a $C_{1-12}$-alkylene group.

Preferably W contains as cationic group an ammonium group, more preferably a quaternary ammonium group.

The group $W^{30}$ may for example be a group of formula $-W^1-N^+R^{23}{}_3$, $-W^1-P^+R^{23a}{}_3$, $-W^1-S^+R^{23a}{}_2$ or $-W^1-Het^+$ in which:

$W^1$ is alkylene of 1 or more, preferably 2–6 carbon atoms optionally containing one or more ethylenically unsaturated double or triple bonds, disubstituted-aryl, alkylene aryl, aryl alkylene, or alkylene aryl alkylene, disubstituted cycloalkyl, alkylene cycloalkyl, cycloalkyl alkylene or alkylene cycloalkyl alkylene, which group $W^1$ optionally contains one or more fluorine substituents and/or one or more functional groups; and either the groups $R^{23}$ are the same or different and each is hydrogen or alkyl of 1 to 4 carbon atoms, preferably methyl, or aryl, such as phenyl or two of the groups $R^{23}$ together with the nitrogen atom to which they are attached form a heterocyclic ring containing from 5 to 7 atoms or the three groups $R^{23}$ together with the nitrogen atom to which they are attached form a fused ring structure containing from 5 to 7 atoms in each ring, and optionally one or more of the groups $R^{23}$ is substituted by a hydrophilic functional group, and the groups $R^{23a}$ are the same or different and each is $R^{23}$ or a group $OR^{23}$, where $R^{23a}$ is as defined above; or Het is an aromatic nitrogen-, phosphorus- or sulphur-, preferably nitrogen-, containing ring, for example pyridine.

Preferably $W^1$ is a straight-chain alkylene group, most preferably 1,2-ethylene.

Preferred groups X of the formula V are groups of formula VI:

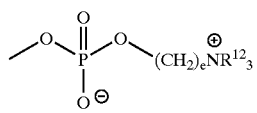

where the groups $R^{12}$ are the same or different and each is hydrogen or $C_{1-4}$ alkyl, and e is from 1 to 4.

Preferably the groups $R^{12}$ are the same. It is also preferable that at least one of the groups $R^{12}$ is methyl, and more preferable that the groups $R^{12}$ are all methyl.

Preferably e is 2 or 3, more preferably 2.

Alternatively the ammonium phosphate ester group VI may be replaced by a glycerol derivative of the formula VB, VC or VD defined in our earlier publication no WO-A-93/01221.

It is possible that polymer A may be formed in situ as a coating on the mould surface. In this case, monomers suitable for forming polymer A are coated, optionally in a liquid vehicle, onto the mould surface and subjected to polymerisation conditions suitable for forming polymer A. Preferably, however, the polymer is pre-formed and coated from a coating composition comprising preformed polymer A onto the mould surface. It is preferred for the polymer to be formed from monomers including a comonomer having a reactive group and a zwitterionic monomer having a zwitterionic group. The polymer formed by copolymerising monomers including a reactive comonomer and the zwitterionic monomer will consequently have both zwitterionic groups and reactive groups. An alternative, less preferred method of producing pre-formed polymer, is to introduce the reactive groups and/or the zwitterionic groups after polymerisation of monomers from a pre-cursor.

The coating polymer may be of any suitable type, for instance any of the types used in EP-A-0362137. The polymer may be an addition or a condensation polymer. Suitable copolymers are polyvinyl alcohol based materials, carbohydrate based polymers such as cellulose and cellulose derivatives, polyesters, polyurethanes, or even silicone polymers.

Most preferably polymer A is formed from the addition polymerisation of ethylenically unsaturated monomers. Most preferably, the polymer is formed from monomers including:

a) a zwitterionic monomer of the general formula I

  Y—B—X (I)

wherein B is a straight or branched alkylene, oxaalkylene or oligo-oxaalkylene chain optionally containing one or more fluorine atoms up to and including perfluorinated chains or, if X or Y contains a terminal carbon atom bonded to B, a valence bond;

X is the zwitterionic group and

Y is an ethylenically unsaturated polymerisable group selected from

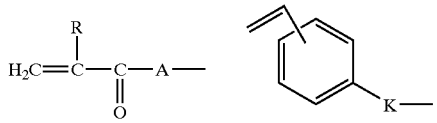

$CH_2=C(R)-CH_2-O-$, $CH_2=C(R)-CH_2OC(O)-$, $CH_2=C(R)OC(O)-$, $CH_2=C(R)-O-$, $CH_2=C(R)CH_2OC(O)N(R^1)-$, $R^{30}OOCCR=CRC(O)-O-$, $RCH=CHC(O)O-$, $RCH=C(COOR^{30})CH_2-C(O)-O-$,

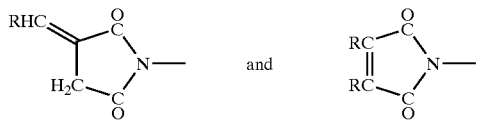

wherein:

R is hydrogen or a $C_1$–$C_4$ alkyl group;

$R^{30}$ is hydrogen or a $C_{1-4}$ alkyl group; or BX

A is —O— or —$NR^1$—; $R^1$ is hydrogen or a $C_1$–$C_4$ alkyl group or $R^1$ is —B—X where B and X are as defined above; and K is a group —$(CH_2)_pOC(O)$—, —$(CH_2)_pC(O)O$—, —$(CH_2)_pOC(O)O$—, —$(CH_2)_pNR^2$—, —$(CH_2)_p NR^2C(O)$—, —$(CH_2)_pC(O)NR^2$—, —$(CH_2)_p NR^2C(O)O$—, —$(CH_2)_pOC(O)NR^2$—, —$(CH_2)_p NR^2C(O)NR^2$—, (in which the groups $R^2$ are the same or different) —$(CH_2)_pO$—, —$(CH_2)_pSO_3$—, or, optionally in combination with B, a valence bond and p is from 1 to 12 and $R^2$ is hydrogen or a $C_1$–$C_4$ alkyl group and b) a reactive monomer of the formula VII $Y^1B^4R^3$  VII wherein $B^4$ is a straight or branched alkylene, oxaalkylene or oligo-oxaalkylene chain optionally containing one or more fluorine atoms up to and including perfluorinated chains, or a valence bond;

$Y^1$ is an ethylenically unsaturated polymerisable group selected from

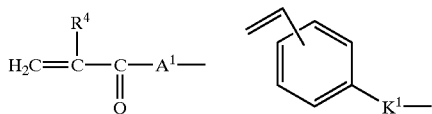

$CH_2=C(R^4)-CH_2-O-$, $CH_2=C(R^4)-CH_2OC(O)-$, $CH_2=C(R^4)OC(O)-$, $CH_2=C(R^4)-O-$, $CH_2=C(R^4)CH_2OC(O)N(R^5)-$, $R^{31}OOCCR^4=CR^4C(O)-O-$, $R^4H=CHC(O)-O-$, $R^4H=C(COOR^{31})CH_2C(O)O-$

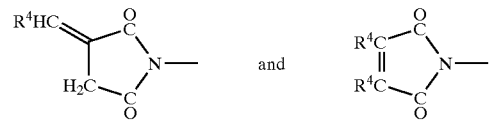

where $R^4$ is hydrogen or $C_1$–$C_4$ alkyl;

$R^{31}$ is hydrogen, a $C_{1-4}$-alkyl group;

$A^1$ is —O— or —$NR^5$—; $R^5$ is hydrogen or a $C_1$–$C_4$ alkyl group or $R^5$ is a group Q;

$K^1$ is a group —$(CH_2)_lOC(O)$—, —$(CH)_lC(O)O$—, —$(CH_2)_lOC(O)O$—, —$(CH_2)_lNR^6$—, —$(CH_2)_l NR^6C(O)$—, —$(CH_2)_lC(O)NR^6$—, —$(CH_2)_l NR^6C(O)O$—, —$(CH_2)_lOC(O)NR^6$—, —$(CH_2)_l NR^6C(O)NR^6$— (in which the groups $R^6$ are the same or different), —$(CH_2)_lO$—, —$(CH_2)_l SO_3$—, a valence bond and l is from 1 to 12 and $R^6$ is hydrogen or a $C_1$–$C_4$ alkyl group;

and $R^3$ is the said reactive group or a precursor of the reactive group of polymer A.

Group $R^3$ is selected so as to be directly reactive with the functional group in the functional compound in the curable composition during the curing step. Alternatively it is a precursor thereof which may be derivatised to form a directly reactive group. The group $R^3$ is preferably a reactive group selected from the group consisting of ethylenically and acetylenically unsaturated group containing radicals; aldehyde groups; silane and siloxane groups containing one or more substituents selected from halogen atoms and $C_{1-4}$-alkoxy groups; hydroxyl; amino; carboxyl; epoxy; —$CHOHCH_2Hal$ (in which Hal is selected from chlorine, bromine and iodine atoms); succinimido; tosylate; triflate; imidazole carbonyl amino; optionally substituted triazine groups; acetoxy; mesylate; carbonyl di(cyclo)alkyl carbodiimidoyl; isocyanate, acetoacetoxy; and oximino. Most preferably $R^3$ comprises an ethylenically or acetylenically unsaturated group. Most preferably $R^3$ is a group $CH_2=CH-$.

In the reactive monomer, $Y^1$ is preferably an acrylic type group, that is the first member of the list of ethylenically unsaturated groups. In such a group $R^4$ is preferably selected from hydrogen, methyl and ethyl, and is most preferably methyl. $A^1$ is generally an oxygen atom, that is the compound is an acrylic ester.

$B^4$ is preferably a straight alkylene group, preferably a $(CH_2)_{1-6}$, most preferably a group $CH_2$. Where the preferred group $R^3$ is $CH_2=CH-$, and $B^4$ is $CH_2$, $A^1$ is an oxygen atom and $R^4$ is hydrogen or methyl, the compound is allylacrylate or allylmethacrylate.

In the zwitterionic monomer of the general formula I, B is preferably a $C_{1-4}$ alkylene, preferably ethylene, a valence bond or a straight or branched alkylene, preferably of the formula —$(CR^{13}_2)_m$—, wherein the groups —$(CR^{13}_2)$— are the same or different and in each group —$(CR^{13}_2)$— the groups $R^{13}$ are the same or different and each group $R^{13}$ is hydrogen or $C_{1-4}$ alkyl, preferably hydrogen, and m is from 1 to 12, preferably 1 to 6, or B is an oxaalkylene groups such as alkoxyalkyl having 1 to 6 carbon atoms in each alkyl moiety, more preferably —$CH_2O(CH_2)_4$—; or an oligo-oxaalkylene group of formula —$[(CR^{14}_2)_nO]_p$— where the groups —$(CR^{14}_2)$— are the same or different and in each group —$(CR^{14}_2)$— the groups $R^{14}$ are the same or different and each group $R^{14}$ is hydrogen or $C_{1-4}$ alkyl, preferably hydrogen, and n is 1 to 6, preferably 2 or 3, and p is from 1 to 12, preferably 1 to 6. Preferably B is a group $(CH_2)_{1-2}$.

In the zwitterionic monomer, the group Y is preferably an acrylic type group, in which R is hydrogen, methyl or ethyl, most preferably methyl. A is preferably an oxygen atom, so that the compound is an (alk) acrylate compound.

Where polymer A is of the preferred type, that is formed from ethylenically unsaturated monomers, usually by radical polymerisation, and the monomers include a reactive monomer in which reactive group $R^3$ is or comprises an ethylenically unsaturated group, polymerisation of the monomers must be carried out under conditions such that the reactive group $R^3$ does not take part to a significant extent in addition polymerisation. The type of group $R^3$ must therefore be different to the ethylenically unsaturated group in Y. This allows polymers having controlled characteristics with a pre-determined level of reactive groups $R^3$, for instance which can be separated, purified and analysed before being used, to coat the mould in the first step of the present process. This provides advantages over the use of a pre-polymer, for instance formed by incomplete polymerisation of ethylenically unsaturated comonomers including di- or higher-functional ethylenically unsaturated monomers in which all of the ethylenic groups are identical to one another. Partially cured polymers formed from such polyfunctional ethylenically unsaturated monomers have been used to provide reactive coatings for moulds in which curable liquid compositions are moulded in EP-A-0207640 and U.S. Pat. No. 4,544,572.

In the present process, the curable composition is generally subject to curing conditions in which polymerisation takes place of liquid monomer or pre-polymer. Alternatively curing may comprise a thermosetting process, for instance in which intermolecular or intramolecular crosslinking of a curable polymer takes place. The functional compound should be curable component which cures to become incorporated into polymer B. Functional groups in the functional compound may be the same groups as participate in the curing reaction to form polymer B. For instance, where the curing involves condensation between dissimilar groups, such as isocyanate or carboxylic and hydroxyl or amine groups, the reactive group on polymer A may be the same as functional groups in the compounds forming the curable composition, that is either a carboxylic acid or activated derivatives thereof, an isocyanate, or a hydroxyl or an amine group.

Where the curable composition includes ethylenically unsaturated, usually radical polymerisable, monomers, the reactive group in polymer A may be a co-polymerisable ethylenically unsaturated group, or alternatively may be a radical forming group, which may act as an initiation site for graft co-polymerisation, or act as a chain transfer agent allowing covalent bonding to a pre-formed chain formed by polymerisation of monomers in the curable composition.

In one particular embodiment of the invention, the curable composition comprises ethylenically unsaturated monomers including functional monomer having a functional group as defined above.

The functional monomer has general formula VIII:

$$Y^2 B^2 R^7 \qquad \text{VIII}$$

wherein $B^2$ is a straight or branched alkylene, oxaalkylene or oligo-oxaalkylene chain optionally containing one or more fluorine atoms up to and including perfluorinated chains, optionally including an alkylene-sulphonamido group, linker or a siloxane group, or $B^2$ is a valence bond;

$Y^2$ is an ethylenically unsaturated polymerisable group selected from

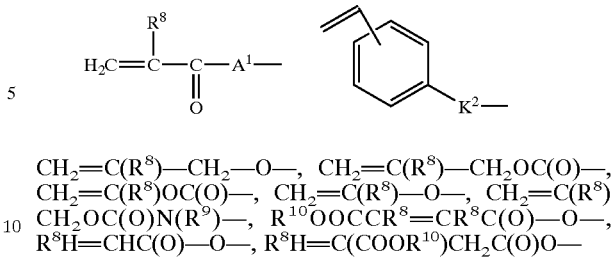

$CH_2=C(R^8)-CH_2-O-$, $CH_2=C(R^8)-CH_2OC(O)-$, $CH_2=C(R^8)OC(O)-$, $CH_2=C(R^8)-O-$, $CH_2=C(R^8)CH_2OC(O)N(R^9)-$, $R^{10}OOCCR^8=CR^8C(O)-O-$, $R^8H=CHC(O)-O-$, $R^8H=C(COOR^{10})CH_2C(O)O-$

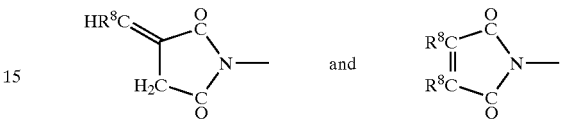

where $R^8$ is hydrogen or $C_1$–$C_4$ alkyl;
$R^{10}$ is hydrogen, a $C_{1-4}$-alkyl group or a group $B^2R^7$;
$A^1$ is —O— or —NR$^9$—; $R^9$ is hydrogen or a $C_1$–$C_4$ alkyl group or R is a group $B^2 R^7$;
$K^2$ is a group $-(CH_2)_kOC(O)-$, $-(CH)_kC(O)O-$, $-(CH_2)_kOC(O)O-$, $-(CH_2)_kNR^{11}-$, $-(CH_2)_kNR^{11}C(O)-$, $-(CH_2)_kOC(O)O-$, $-(CH_2)_kNR^{11}-$, $-(CH_2)_k NR^{11}C(O)-$, $-(CH_2)_kC(O)NR^{11}-$, $-(CH_2)_kNR^{11}C(O)O-$, $-(CH_2)_kOC(O)NR^{11}-$, $-(CH_2)_kNR^{11}C(O)NR^{11}-$ (in which the groups $R^{11}$ are the same or different), $-(CH_2)_kO-$, $-(CH_2)_kSO_3-$, a valence bond and k is from 1 to 12 and $R^{11}$ is hydrogen or a $C_1$–$C_4$ alkyl group;
$R^7$ is a functional group which reacts with the reactive group of polymer A or, where the reactive group of polymer A is an ethylenically unsaturated group, $R^7$ is hydrogen, $C_{1-24}$ alkyl, $C_{1-24}$ hydroxyalkyl, $C_{1-24}$ fluoroalkyl, $C_{2-4}$ alkoxy($C_{2-24}$)alkyl, a siloxane group $(SiR^{19}{}_2)(OSiR^{19}{}_2)_qR^{19}$ in which each $R^{19}$ is a $C_{1-12}$-alkyl group or a trialkylsiloxy group in which each alkyl has 1 to 12 carbon atoms, and q is 0 to 49, or a group of formula $Y^2$.

Where $R^7$ is a functional group, it is preferably selected from the group consisting of ethylenically and acetylenically unsaturated group containing radicals; aldehyde groups; silane and siloxane groups containing one or more substituents selected from halogen atoms and $C_{1-4}$-alkoxy groups; hydroxyl; amino; carboxyl; epoxy; —CHOHCH$_2$Hal (in which Hal is selected from chlorine, bromine and iodine atoms); succinimido; tosylate; triflate; imidazole carbonyl amino; optionally substituted triazine groups; acetoxy; mesylate; carbonyl di(cyclo)alkyl carbodiimidoyl; isocyanate; acetoacetoxy and oximino.

The curable composition may further contain di-, tri- or poly-unsaturated crosslinking monomers which are copolymerisable with the other components of the composition. For instance, such crosslinking monomers have two or more similar ethylenically unsaturated groups. Examples are methylene bisacrylamide, ethylene glycoldimethacrylate, siloxane dimethacrylate, such as poly(dimethylsiloxane) dimethacrylate, poly(ethyleneglycol)dimethacrylate, glycerol di- or tri-methacrylate, or pentaerythritol di-, tri- or tetra-methacrylate.

Generally polymer A as well as the curable composition comprise diluent comonomers. In each case, the diluent comonomers may be used to give the polymer desired physical and mechanical properties. For both polymer A and the curable composition formed of ethylenically unsaturated monomers, particular examples of diluent comonomers include alkyl(alk)acrylates preferably containing 1 to 24 carbon atoms in the alkyl group of the ester moiety, such as methyl methacrylate or dodecyl methacrylate; dialkylamino alkyl(alk)-acrylates and -acrylamides preferably containing 1 to 4 carbon atoms in each alkyl moiety of the amine and 1 to 4 carbon atoms in the alkylene chain and/or quaternary derivatives thereof, e.g. 2-(dimethylamino)ethyl (alk) acrylate; N-alkyl(alk)acrylamides and N,N-dialkyl(alk) acrylamides preferably. containing 1 to 4 carbon atoms in the or each N-alkyl group; hydroxyalkyl(alk)-acrylates and -acrylamides preferably containing from 1 to 4 carbon atoms in the hydroxyalkyl moiety, e.g. a 2-hydroxyethyl(alk) acrylate, glycerylmonomethacrylate or polyethyleneglycol monomethacrylate; or a vinyl monomer such as an N-vinyl lactam, preferably containing from 5 to 7 atoms in the lactam ring, for instance vinyl pyrrolidone; (meth) acrylamide; (meth)acrylonitrile; ethylenically unsaturated acids, and anhydrides, such as (alk)acrylic, maleic, and fumaric acids and monoesters of the dibasic acids; styrene or a styrene derivative which for example is substituted on the phenyl ring by one or more alkyl groups containing from 1 to 6, preferably 1 to 4, carbon atoms, and/or by one or more halogen, such as fluorine atoms, e.g. (pentafluorophenyl) styrene. Preferably the diluent is non-ionic.

Diluent comonomers in polymer A are useful for controlling the surface activity of the polymer and hence its ability to coat a mould surface. Suitable diluent comonomers for providing a hydrophobic polymer A are $C_{2-24}$-alkyl-(alk) acrylates and -(alk)acrylamides, $C_{1-24}$-fluoroalkyl-(alk) acrylates and -(alk)acrylamides, and siloxane substituted (alk)acrylates and -(alk)acrylamides eg having siloxane groups of the formula $(CR^{18}{}_2)_r(SiR^{17}{}_2)(OSiR^{17}{}_2)_qR^{17}$ where the or each $R^{18}$ is hydrogen or $C_{1-4}$ alkyl (preferably hydrogen), r is 0 to 6, each $R^{17}$ is independently selected from $C_{1-12}$ alkyl and trialkylsiloxy groups in which the alkyl groups have 1 to 12, preferably, carbon atom, (preferably all groups $R^{17}$ are methyl) and q is 0–49. Hydrophobic diluents especially fluoroalkyl or siloxane group containing monomers may confer improved adsorption properties for use with hydrophobic mould surfaces.

Other suitable diluent comonomers include polyhydroxyl for example sugar, (alk)acrylates and (alk)acrylamides in which the alkyl group contains from 1 to 4 carbon atoms, e.g. sugar acrylates, methacrylates, ethacrylates, acrylamides, methacrylamides and ethacrylamides. Suitable sugars include glucose and sorbitol. Particularly suitable diluent comonomers include methacryloyl glucose or sorbitol methacrylate.

Further diluents which may be mentioned specifically include polymerisable alkenes, preferably of 2–4 carbon atoms, eg. ethylene, dienes such as butadiene, alkylene anhydrides such as maleic anhydride and cyano-substituted alkylenes, such as acrylonitrile.

Other suitable monomers which may be included in polymer A or, more preferably, the curable composition, are acrylic functional siloxanes eg mono- or di-functional siloxanes. Acrylic functional silanes in the curable composition are usually present in admixture with acrylic diluent comonomers described above.

In another embodiment of the present process, the curable composition forms a polysiloxane polymer. The curable composition may be formed of liquid pre-polymer, for instance hydrosilyl groups which react with silicone vinyl groups to form crosslinks in the presence of catalyst such as a platinum compound. Such pre-polymers may be provided with functional groups which react with the reactive groups of the polymer A during the curing reaction. It is most preferred for the reactive groups of polymer A to be ethylenically unsaturated groups and for these to react with hydrosilyl groups during the curing (crosslinking).

Curing of siloxane pre-polymers (eg approximately equivalent amounts of hydrosilyl group-containing polysiloxane and of vinyl substituted polysiloxane known as two-part silicones) may be conducted in the presence of a suitable catalyst for the curing reaction and/or for the reaction between the functional group and the reactive group. Suitable catalysts are, for instance platinum complexes, organotitinate compounds, acids and bases, the selection being determined by the curing reaction which takes place.

For this embodiment, a process is achieved which allows a highly hydrophobic bulk polymer to be provided with a surface with readily tailorable characteristics, such as of highly hydrophilic nature. Polysiloxane bulk polymers are of particular utility in formation of articles which are desired to have high oxygen, or other gas, permeability. Such materials are, for instance, used in corneal refractive devices, especially contact lenses, or in pre-corneal devices such as intraocular lenses or intraocular contact lenses (phakic intraocular lenses).

It is believed that the present inventors, have for the first time, provided a process of the type described in EP-A-0362137, in which the reactive coating polymer A' coated onto the mould surface, is formed by the copolymerisation of ethylenically unsaturated monomers including dual ethylenically unsaturated monomer of the general formula IX:

$$Y^1B^4R^{15} \qquad \qquad IX$$

wherein $Y^1$ and $B^4$ are as defined for the compound of the general formula VII above, and $R^{15}$ is an ethylenically unsaturated organic group.

As described above in relation to compounds of the general formula VII, ethylenically unsaturated groups $R^{15}$ (corresponding to groups $R^3$ in the compounds of the formula VII), comprise a group which may not be subject to polymerisation in the polymerisation reaction of ethylenically unsaturated group Y in the polymerisation reaction to form the polymer.

In this aspect of the invention, therefore, there is provided a process of the general type set out in the preamble to claim 16, and is characterised in that polymer A' is formed from ethylenically unsaturated monomers including monomer of the general formula IV, in which $Y^1$ and $B^4$ are as defined above in relation to compounds of the general formula II, and $R^{15}$ is an ethylenically unsaturated group, provided that $R^{15}$ is not the same as $Y^1$.

In this aspect of the invention, polymer A' need not include zwitterionic groups. Preferably however it does include such groups, for instance introduced into the polymer through inclusion of zwitterionic monomers eg of the general formula I with the ethylenically unsaturated monomers IX.

In this second aspect of the invention, bulk polymer B may be formed from ethylenically unsaturated monomers or, preferably, may be a polysiloxane product, as described above in relation to the first aspect of the invention.

The group $R^{15}$ is preferably selected from preferred groups $R^3$ which are unsaturated as described above, more preferably is a group $CH_2=CH—$. Preferred monomers of the general formula IX are allylmethacrylate and allylacrylate.

In both aspects of the invention, a polymer coated onto the mould, may be partially reacted prior to addition of the liquid curable composition, for instance, to cross-link the polymer through reaction of a portion of reactive groups, provided adequate reactive groups in the partially reacted polymer, which forms polymer A or A', are available for reacting in the curing step.

Both polymer A and polymer A' may contain pre-cross-linkable groups, for instance introduced by including pre-cross-linkable monomer in the starting formulation. Such monomers contain a cross-linkable group, which is a different group to the reactive group and which is capable of forming intermolecular crosslinks, for instance after coating the precursor of polymer A onto the mould surface. In one embodiment such intermolecular cross-linking should take place under conditions which do not result in simultaneous reaction of the reactive groups of the polymer which would otherwise deactivate the polymer and prevent its subsequent reaction with the curable composition in the curing reaction. Such cross-linking may stabilise the coating on the mould and/or on the final product. In another embodiment the crosslinkable groups may react to form intermolecular cross-links under the same conditions under which curing to form polymer B takes place, so that curing, reaction of reactive groups in polymer A/A' with functional groups in the curable composition and cross-linking take place simultaneously. The cross-linking may provide additional stability of the coating in the final product, especially in the region of the coating away from the interface between coating polymer A/A' and bulk polymer B. Suitable intermolecular cross-linking groups are cinnamyl, epoxy, —CHOHCH$_2$Hal (in which Hal is chlorine, bromine or iodine), methylol, silyl groups having 1 to 3 halogen, C$_{1-4}$ alkoxy or C$_{2-4}$ alkanoyloxy substituents, acetylenically unsaturated groups, acetoacetoxy and chloroalkyl sulphone groups, preferably trialkoxysilyl groups.

In the second aspect of the invention, a claimed moulding process preferably involves the preliminary step of forming polymer A'. Where the curable composition used to form polymer B consists of ethylenically unsaturated monomers which are, in the curing reaction, subjected to radical polymerisation, the initial step of forming polymer A' is carried out under polymerisation conditions different to the curing reaction. These conditions may comprise the use of different radical initiators in the two steps, or the use of different temperatures, with a higher temperature in the curing reaction, or the use of actinic radiation in one step and not the other step. Sometimes the use of more concentrated monomers in the curing step may lead to reaction of reactive groups which did not react in the reaction to form polymer A'. The use of monomers in the two steps having different ethylenically unsaturated groups may be adequate to provide differential reactivity of the reactive group. For instance acrylic monomers may be used in one polymer and methacrylic in the other. Preferably the reaction conditions used to make polymer A' involve a peroxide initiator such as bis(4-tert-butylcyclohexyl)peroxidicarbonate, while the curing of a curable composition comprising ethylenically unsaturated monomers may involve UV initiation, actinic radiation and/or a suitable catalyst. The conditions provide polymer A' which is substantially non-crosslinked, and which may be dissolved in a suitable solvent.

The cross-linkable precursor of polymer A having pendant ethylenically unsaturated groups and pendant zwitterionic groups is believed to be a novel polymer. According to a third aspect of the invention, therefore, there is provided a novel polymer formed by polymerising ethylenically unsaturated monomers including a) a zwitterionic monomer of the general formula I

wherein B is a straight or branched alkylene, oxaalkylene or oligo-oxaalkylene chain optionally containing one or more fluorine atoms up to and including perfluorinated chains or, if X or Y contains a terminal carbon atom bonded to B, a valence bond;

X is the zwitterionic group and

Y is an ethylenically unsaturated polymerisable group selected from

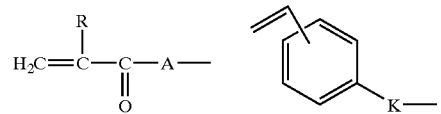

CH$_2$=C(R)—CH$_2$—O—, CH$_2$=C(R)—CH$_2$OC(O)—, CH$_2$=C(R)OC(O)—, CH$_2$=C(R)—O—, CH$_2$=C(R)CH$_2$OC(O)N(R$^f$)—,
R$^{30}$OOCCR=CRC(O)—O—, RCH=CHC(O)O—,
RCH=C(COOR$^{30}$)CH$_2$—C(O)—O—,

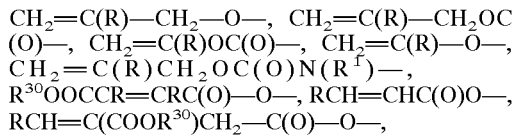

wherein:
R is hydrogen or a C$_1$–C$_4$ alkyl group;
R$^{30}$ is hydrogen or a C$_{1-4}$ alkyl group; or BX
A is —O— or —NR$^1$—; R$^1$ is hydrogen or a C$_1$–C$_4$ alkyl group or R$^1$ is —B—X where B and X are as defined above; and
K is a group —(CH$_2$)$_p$OC(O)—, —(CH$_2$)$_p$C(O)O—, —(CH$_2$)$_p$OC(O)O—, —(CH$_2$)$_p$NR$^2$—, —(CH$_2$)$_p$NR$^2$C(O)—, —(CH$_2$)$_p$C(O)NR$^2$—, —(CH$_2$)$_p$NR$^2$C(O)O—, —(CH$_2$)$_p$OC(O)NR$^2$—, —(CH$_2$)$_p$NR$^2$C(O)NR$^2$—, (in which the groups R$^2$ are the same or different) —(CH$_2$)$_p$O—, —(CH$_2$)$_p$SO$_3$—, or, optionally in combination with B, a valence bond and p is from 1 to 12 and R$^2$ is hydrogen or a C$_1$–C$_4$ alkyl group b) dual ethylenically unsaturated monomer of the general formula IX:

$$Y^1B^4R^{15} \qquad \text{IX}$$

wherein Y$^1$ and B$^4$ are as defined for the compound of the general formula VII above, and R$^{15}$ is an ethylenically unsaturated organic group, and c) cross-linkable monomer of the general formula XI $$Y^3B^3R^{20} \qquad \text{XI}$$

in which B$^3$ is a straight or branched alkylene, oxaalkylene or oligo-oxaalkylene chain optionally containing one or more fluorine atoms up to and including perfluorinated chains, or a valence bond;

Y$^3$ is an ethylenically unsaturated polymerisable group selected from

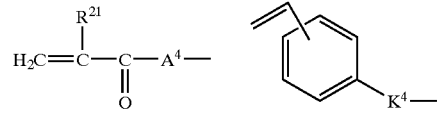

CH$_2$=C(R$^{21}$)—CH$_2$—O—, CH$_2$=C(R$^{21}$)—CH$_2$OC(O)—, CH$_2$=C(R$^{21}$)OC(O)—, CH$_2$=C(R$^{21}$)—O—, CH$_2$=C(R$^{21}$)CH$_2$OC(O)N(R$^{22}$)—, $R^{29}OOCCR^{21}=CR^{21}C(O)-O-$, $R^{21}H=CHC(O)-O-$, $R^{21}H=C(COOR^{29})CH_2C(O)O-$

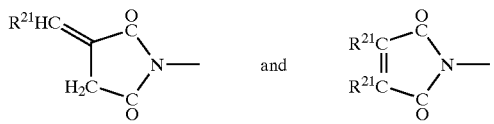

and where
$R^{21}$ is hydrogen or $C_1$–$C_4$ alkyl;
$R^{29}$ is hydrogen, a $C_{1-4}$-alkyl group;
$A^4$ is —O— or —$NR^{22}$—;
$R^{22}$ is hydrogen or a $C_1$–$C_4$ alkyl group or $R^{22}$ is a group $B^3R^{16}$;
$K^4$ is a group —$(CH_2)_rOC(O)$—, —$(CH)_rC(O)O$—, —$(CH_2)_rOC(O)O$—, —$(CH_2)_rNR^{22}$—, —$(CH_2)_rNR^{22}C(O)$—, —$(CH_2)_rC(O)NR^{22}$—, —$(CH_2)_1NR^{22}C(O)O$—, —$(CH_2)_rOC(O)NR^{22}$—, —$(CH_2)_rNR^{22}C(O)NR^{22}$— (in which the groups $R^{22}$ are the same or different), —$(CH_2)_rO$—, —$(CH_2)_rSO_3$—, a valence bond and r is from 1 to 12 and
$R^{20}$ is different to $R^{15}$ and is a cross-linkable group.

Generally the monomers also include one or more diluent monomer, selected from those described above.

Preferably $R^{20}$ is selected from cinnamyl, epoxy, -CHOHCH$_2$Hal (in which Hal is chlorine, bromine or iodine), methylol, silyl groups having 1 to 3 halogen, $C_{1-4}$ alkoxy or $C_{2-4}$ alkanoyloxy substituents, acetylenically unsaturated groups, and aceloacetoxy and chloroalkyl sulphone groups, preferably reactive silyl and epoxy groups.

In the monomer of the general formula XI $Y^3$ is selected from the same preferred groups as Y, and $B^3$ is selected from the same preferred groups as B.

In this aspect of the invention $R^{15}$ is preferably not the same as $Y^1$. Most preferably $R^{15}$ is $CH_2=CH-$.

Preferably Y, $Y^1$ and $Y^3$ are the same, most preferably $CH_2C(CH_3)COO-$.

The present invention provides a polymerisation process for producing the novel cross-linkable polymer, a coating composition containing the polymer and a liquid vehicle in which the polymer is dissolved or dispersed, a coating process in which the coating composition is coated onto a substrate and is solidified, optionally including the further step of cross-linking the polymer in the coating, and the product of such a coating process.

The liquid vehicle of the novel coating compositions may be a non-polymerisable solvent, for instance in which the polymer may be dissolved or dispersed. The solvent is, for instance an aqueous and/or organic liquid, preferably comprising an alcohol, glycol and/or an alkane.

The solidification step may involve removal by evaporation of the solvent, for instance under raised temperature and/or reduced pressure. The cross-linking step may be carried out, during or after the solidification step. In this specification solidifcation includes gelification or any step in which the polymer is immobilised on the substrate.

The substrate coated with the novel polymer may be used in the in-mould process of the first and second aspects of the invention. Alternatively the pendant ethylenic groups $R^{15}$ and/or the cross-linkable group $R^{20}$ may be useful as functional groups to which ligands, such as dyes, U.V. absorbers, pharmaceutically active agents, etc, may be conjugated. Although the novel polymers are generally used in coating processes, they may alternatively be cross-linked in bulk, e.g. in a mould.

For polymer A, polymer A' comprising further zwitterionic comonomer and the novel cross-linkable polymer, the molar ratio of reactive monomer of dual ethylenically unsaturated monomer as the case may be to zwitterionic monomer is preferably in the range 20:1 to 1:20, most preferably in the range 10:1 to 1:10, more preferably in range 5:1 to 1:5.

Where diluent monomer is included in polymer A or polymer A', the total molar content of diluent may be up to 95%, for instance up to 90%, most preferably up to 75%. Preferably diluent is present, in an amount of at least 10 mole %, more preferably at least 25 mole %.

Pre-cross-linkable monomer may be included in the ethylenically unsaturated monomer in a molar amount in the range 0.01 to 25%, preferably an amount in the range 0.1 to 10%, more preferably 1–10%.

Polymer A, polymer A' and the novel cross-linkable polymer preferably have a molecular weight in the range $10^3$–$10^6$, preferably in the range $2 \times 10^3$ to $2 \times 10^5$. Preferably, in the coating composition, they are substantially non-cross-linked (optionally cross-linkable) and hence potentially soluble in a suitable solvent.

Polymer A, polymer A' and/or the cross-linkable polymer may have pendant ligands, for instance pharmaceutically active compounds, dye molecules, UV absorbers etc. Such ligands may be introduced by incorporation of ligand group containing monomers in the polymerisation or may be post reacted on to the polymer before or after coating of the mould, or even after demoulding of the coated moulded product.

The coating composition, formed of preformed polymer A, polymer A' or cross-linkable polymer, generally comprises the polymer in solution or dispersion form in a suitable liquid vehicle. The liquid vehicle may be aqueous or organic solvent based. Suitable solvents may be selected as desired to achieve adequate levels of dissolution of the substantially non-cross-linked polymer. Preferred organic solvents are lower alkanols and glycols. The coating composition may contain other components which are either inert diluents or which improve the coating performance or the reaction between polymer A and the curable composition. For instance the composition may include surfactants, pharmaceutically active compounds, dyes, UV absorbers, pigments, activating agents, catalysts, initiators, chain transfer agent, additional monomer, cross-linking agents, eg having two functional groups for linking to polymer pendant reactive groups, etc. Components which are not permanently bound to polymer A or polymer B may be removed after coating of the mould and before it is filled with curable composition, or after curing and removal of the moulded product from the mould, for instance by washing with a suitable washing solution.

In the process in which coating composition comprising preformed polymer is coated onto a mould surface, the solvent may or may not be removed prior to contacting the coated surface with curable composition. It may be desirable to remove the solvent in order to form a physically stable coating on the mould surface which is not displaced upon filling of the mould with curable composition. Removal of solvent is generally by evaporation, for instance under reduced pressure.

The curable composition may consist only of components which form part of bulk polymer B. The curable composition should be in liquid form when applied to the mould. Where components of the curable composition for instance monomers, are liquids at room temperature, any solid components of the curable composition may be dissolved or dispersed in the liquid monomer. Alternatively, or additionally, it may be desirable to include in the curable composition a liquid vehicle, for instance a solvent for dissolving solid components or increasing the compatibility of immiscible liquid components. Alternatively the curable composition may include a solid or liquid diluent, for instance which is included to provide desired physical characteristics after polymerisation. Any non-polymerisable diluent included in the curable composition may be removed after polymerisation, for instance by evaporation or, more usually by washing using a liquid rinse composition.

The curable composition generally comprises components to optimise curing such as initiators, catalysts, chain transfer agents, chain terminating agents, cross-linking agent, such as di- or oligo-unsaturated comonomers, polymerisation inhibitors etc. The curable composition may also contain fillers and/or pigments, especially particulate filler such as titanium dioxide.

For a curable composition based on ethylenically unsaturated monomer the functional monomer is generally present in a molar amount of at least about 1%, preferably at least 5%, up to about 50%, for instance up to 33%. Any crosslinking monomer is generally present in a molar amount in the range 0.01 to 10 mole %, preferably 0.1 to 5.0 mole % for instance 0.5–2.0%. Diluent comonomer is suitably present in an amount of at least 25% molar, preferably at least 50% molar, for instance at least 67%.

The invention may work with most moulds. The mould should preferably be substantially free of surface functional groups which would otherwise form covalent bonds with the reactive groups of polymer A, polymer A' or the cross-linkable polymer. It may be desirable to pretreat a mould to render its surface non-reactive with the coating polymer. For instance a steel surface may be passivated. Alternatively a release layer may be added previously to the mould to prevent contact of an otherwise reactive mould surface with the polymer. The mould may be made of a polymeric material such as polyolefin or polyester.

The cured coated moulded product may be demoulded by any suitable means which disrupts the adhesion between the mould and coating polymer A or A'. Where, as in a preferred aspect polymer A or A' is relatively hydrophilic, demoulding may involve hydration, which leads to a swelling of the coating and disruption of the adhesion to the mould.

Advantages which the approach of the present invention may have over the prior art include:

1) The coating polymer is prepared in a single step and is easy to purify.
2) The composition of the coating copolymer can be tailored over a wide range of hydrophilicity, functionality, etc. The amount of covalent binding group (such as allyl methacrylate) can be varied over a very wide range to control thickness, reactivity, etc.
3) The coating is tightly bound to the surface of the moulded device as there are many potential reactive sites on the coating. This also ensures a homogenous coverage.
4) The coating is reactive to both addition polymerised (Pt cure silicones) and free radical polymerised moulded substrates.
5) The coating polymer film forms readily to provide a smooth, homogenous coating.

The invention is illustrated further in the following examples:

Performance Tests

Granulocyte Activation by Novel Materials

Introduction

Granulocyte activation has been defined as a useful measure of enhanced biocompatibility. This protocol measures granulocyte activation in response to stimuli with beads of polymethylmethacrylate (PMMA) and modified materials. It employs an initial purification step to separate out polymorphonuclear leucocytes (PMN's) from venous blood. This mixture of cells is then incubated with potential novel materials for ten minutes in the presence of nitroblue tetrazolium (NBT). This allows the oxidative burst triggered by inflammatory materials to be visualised colourimetrically.

Materials and Suppliers

| Histopaque-1077 | Sigma Cat. No. H8889 |
| Histopaque-1119 | Sigma Cat. No. 1119-1 |
| PMA (phorbol ester) | Sigma Cat. No. P8139 |
| NBT reagent | Sigma Cat. No. B1911 |

Phenol Red Free Earle's Salt Solution (ESS) Gibco-BRL Cat.No. 24010-043

Procedure

A 20 ml sample of venus blood is contacted with defibrinating beads until a silvery-red clot is attached to the beads. 20 mls ESS is added to the blood. Into a plastic tube 5 ml Histopaque 1119 is placed followed by a layer of 5 ml Histopaque 1077, followed by 10 ml of the diluted blood. The tube is centrifuged to separate the polymorphonuclear leucocytes, which form the lower layer. The PMN's are washed with ESS three times and suspended in 10% a foetal calf serum. A cell density of $10^6$ cells per ml is produced by dilution. About 100 $\mu$l of the cell suspension is then added to discs of test material using polymethylmethacrylate (PMMA) discs as a positive control and PMMA coated with a 2:1 copolymer of dodecylmethacrylate: MPC, synthesised and coated as described in WO-A-93/01221, as a reference for adequate biocompatibility performance. The cells are allowed to stand for at least 30 minutes at 37° C., then washed with PBS. Adherent cells are then incubated with NBT solution (100 $\mu$l) for at least one hour at 37° C. Subsequently the adherent cells are fixed the paraformaldehyde then washed again and viewed under light microscopy. Adhered cells and activated granular sites, which appear blue, are enumerated.

Corneal Touch Test

Introduction

Damage to the endothelial layer of the cornea following intraocular lens (IOL) implantation is a serious problem in a minority of cataract operations. Of the lens materials which have been evaluated PMMA has been shown to cause the most traumatic effects. An in vitro assay capable of evaluating the effects of contact with novel base materials on the corneal endothelium has thus been developed. This utilises the BCE/D bovine corneal endothelial cell line. BCE/D has an indefinite growth potential and expresses a similar spectrum of function-related enzymes to those found in the normal human cornea.

Materials and Suppliers

| | |
|---|---|
| Modified Eagle's Medium (MEM) | Gibco |
| Foetal Calf Serum (FCS) | Gibco |
| New Born Calf Serum (NCS) | Gibco |
| 6 well tissue culture plates (Sterile) | Nunc |
| Bovine Corneal Endothelial Cells | Commercial |
| Phosphate Buffered Saline (PBS) tablets pH7–7.4 | Oxoid |

Procedure

Corneal endothelial cells are cultured to confluence in MEM plus 10% FCS and 5% NCS. A 13 mm disc of the material under test is placed gently on the surface of the cells in the plate. After a predetermined period (for instance 5 minutes) the test material is removed, medium which had been removed replaced and the cells allowed to recover for 30 minutes. Cellular damage is scored under a light microscope as compared to the control (non-contacted) monolayer using image analysis.

Again PMMA is used as a positive control, and PMMA coated with 2:1 (mole) copolymer of dodecylmethacrylate and 2-methacryloyloxy-2'-trimethylammonium ethyl phosphate inner salt (PMMA-PC) as a reference example.

Determination of Rabbit Lens Epithelial Cell Adhesion to Biomaterials

Introduction

AGO4677 rabbit lens epithelial cells are a primary cell strain obtained from the Corriell Repository in New York and have been used to determine the number of cells which adhere to the surface of a material. This gives a relative measure of the biocompatibility of a material. The assay measures cell biomass by using extraction of cellular ATP from the attached cells.

Materials

| | |
|---|---|
| Rabbit Lens Epithelial Cells | NIA AGO4677 |
| Minimal Essential Medium with Glutimax | Gibco 42360-024 |
| Foetal Bovine Serum | Sigma F7524 |
| 1X Trypsin-EDTA solution | Sigma T5775 |

Methodology

Rabbit lens epithelial cells are cultured to confluence or near confluence, detached using trips in and suspended, washed and resuspended at a cell density of around 6000 cells per ml. Samples of the material under test are placed into wells of a plate with 1 ml of the cell suspension and incubated at 37° C. for 72 hours. The test materials are removed and washed three times with sterile PBS to remove non-adhered cells. The materials are then placed in wells of a further plate, to which 500 µl of lysis buffer (1% TCA and 2 mM EDTA in PBS) is contacted in the wells for 15 minutes at room temperature and subsequently at −70° C. Extracted ATP is removed from the well and diluted once with tris acetate buffer. ATP monitoring reagent (firefly luciferase) is placed in a luminometer cuvette, and the background emission read. Subsequently 150 µl of the hypotonic extract is added to each well and the constant level of light emission determined. From this the relative ATP levels and consequently the relative levels of epithelial cell attachment, are determined by subtracting the background from the sample values. PMMA is used as a positive control and PMMA-PC as a reference example.

*Escherichia coli* Adhesion Assay

*E. coli* Stock Culture NCTC 10964 (10% glycerol in nutrient broth) (PHLS) 20° C.
*E. coli* Rabbit Polyclonal HRP-conjugate (DAKO) 4° C.
CLED with Andrades Agar Plates (Oxoid) 4° C.
Mueller Hinton Broth (Oxoid) 4° C.
Nutrient Broth (Oxoid) 4° C.
Phosphate-citrate Buffer with Urea
Peroxide Tablets (Sigma) 4° C.
O-phenylene Diamine Tablets (10 mg/ml) (OPD) (Sigma) 4° C.
Bovine Serum Albumin (Sigma) 4° C.
PBS (BDH) RT Procedure

*E. coli* Stock Culture is sub-cultured on agar overnight at 37° C. An isolated colony is inoculated into Mueller Hinton broth and incubated at 37° C. for 18 hours. Aliquots of the suspension are then cultured further in nutrent broth in contact with samples under test for 18 hours at 37° C. The samples are then washed four times with PBS. The washed samples are then contacted with blocking buffer (1% BSA in PBS) to reduce non specific binding, for 1 hour at room temperature. The blocked samples are then washed and contacted with polycolonal rabbit antibody to *E coli*, conjugated to horseradish peroxidase for 1 hour at room temperature. The samples are washed and then incubated in contact with ortho-phenylene-diamine in PCB for a predetermined period of time. The absorbences at 450 nm are read and compared to a control.

Assessment of Coated Lens Surfaces and Optical Properties

The surface characteristics of some of the coated lenses was assessed using the following techniques:

a) Optical clarity was assessed by visual inspection to determine whether the coatings impact on the optical properties of the lens.

b) Dynamic contact angle measurements were made using the Wilhelmy plate method on a Cahn DCA analyser.

c) Lubricity/blocking was assessed by rubbing the wet lens between finger and thumb and assessing the ease of movement. Over the surface of the lens. A score of 1=surface lubricious with no blocking of movement over its surface. A score of 5=surface not lubritious and tends to block or hinder movement over its surface.

d) The nature of the chemical groups on the surface of the lens was studied using ESCA (Electron Spectroscopy for Chemical Analysis).

All tests were performed after the coated lens had been autoclaved at 121° C. in BBS buffer for 30 minutes, cleaned with Miraflow for 1 minute and then thoroughly rinsed in Ultra-Pure water to remove any traces of surfactant cleaner.

EXAMPLE 1

Coating of Platinum Cured Silicones

A 4:1 mole copolymer of alyl methacrylate (AM) and 2-(methacryloyloxy ethyl)-2'-(trimethylamnmonium)ethyl phosphate inner salt (MPC) was prepared by free radical polymerisation. A solution of ethanol (34.5 g)/ethyl acetate (25.5 g) was placed under nitrogen at 60° C. AM (3.1 g) and MPC (30 g) in ethanol (45 g)/ethyl acetate (54 ml) and a solution of bis(4-tert-butylcyclohexyl)peroxydicarbonate (0.075 g) in ethyl acetate (19.5 g) were fed into the solution over four hours and then the reaction mixture was left for a further hour. A second solution of bis(4-tert-butylcyclohexyl)peroxydicarbonate (0.015 g) in ethanol (6 ml)/ethyl acetate (4.5 ml) was then added to the reaction solution and left stirring for 1 hour. The copolymer was precipitated in acetone and dried. The copolymer was applied to the inner surface of a polyethylene terephthalate (PET) mould liner by dip coating from ethanol (50 mg/ml polymer solution). A liquid silicone rubber formulation (Applied Silicone Corporation 40072) was poured into the coated mould. The mould was then closed and cured at 80° C. for 12 hours. The resulting silicone membranes were removed from the moulds and rinsed in deionised water. The surface of the membranes was more wettable and lubricious than membranes made from the same silicone rubber formulation using uncoated PET moulds. The static contact angle of the membranes was evaluated using the sessile drop method and dynamic contact angle (DCA) measurement using standard DCA test wherein the probe solution is borate buffered saline, using the Wilhelmy plate method with a speed of 160 μm/s. The lubricity of the membranes was evaluated on a scale of 12–5 (1 represents a non-slippy, blocking surface, 5 indicates a lubricious, non-blocking surface).

To test the durability of the coating, the membranes were sterilised at 121° C. for 30 minutes in a borate buffered saline and then cleaned using a marketed contact lens cleaner (MiraFlow). The wettability of the coated membrane remained high compared to the uncoated membrane and the lubricity was also maintained.

TABLE 1

| Sample | Surface Properties | | | |
| --- | --- | --- | --- | --- |
| | Wettability (retraction test) | Lubricity (blocking) | Advancing contact angle (°) | Receding contact angle (°) |
| Uncoated membrane | 1 | 1 | 88 | 34 |
| Uncoated membrane, autoclaved & cleaned | 1 | 2 | 101 | 61 |
| MPC-allyl methacrylate coated membrane, autoclaved & cleaned | 5 | 5 | 49 | 53 |

ESCA (Electron Spectroscopy for Chemical Analysis) was used to confirm the presence of nitrogen and phosphorus which are characteristic of the phosphoryicholine-containing coating. At 7–10 nm analysis depth there was approximately 0.5 atom % nitrogen and phosphorus, consistent with a thin coating.

Samples for biocompatibility tests were prepared by an identical method except that the cure time was 30 minutes at 150° C. The biocompatibility of the coated materials was assessed after autoclaving and cleaning with MiraFlow. The adhesion of rabbit lens epithelial cells, bacteria (E. coli) and granulocytes was assessed by in vitro assays. The damage to corneal lens endothelial cells was also assessed in vitro. The results are in FIGS. 1 to 4.

EXAMPLE 2

Coating of Platinum Cured Silicones

A 2-:50:30 copolymer of AM, methylmethacrylate (MMA) and MPC was prepared by free radical polymerisation in a similar fashion to Example 1. The copolymer was purified by precipitation in acetone and dried under vacuum.

The copolymer was applied to the inner surface of a PET mould liner by dip coating from ethanol (polymer concentration 10 mg/ml). A liquid silicone rubber formulation (Applied Silicone Corporation 40072) was poured into the coated mould. The mould was then closed and cured at 150° C. for 30 minutes. The resulting silicone membranes were removed from the moulds and rinsed in deionised water. The surface of the membranes was substantially more wettable and lubricious than membranes made from the same silicone rubber formulation using uncoated PET moulds.

To test the durability of the coating, the membranes were sterilised at 121° C. for 30 minutes in a borate buffered saline and then cleaned using a marketed contact lens cleaner (MiraFlow). The wettability of the coated membrane remained high compared to the uncoated membrane and the lubricity was maintained.

Wettability and lubricity are shown in Table 2 below.

TABLE 2

| Sample | Surface Properties | |
| --- | --- | --- |
| | Wettability (retraction test) | Lubricity (blocking) |
| Uncoated membrane | 1 | 1 |
| Uncoated membrane, autoclaved & cleaned | 1 | 2 |
| MPC-MMA-allyl methacrylate coated membrane | 5 | 5 |
| MPC-MMA-allyl methacrylate coated membrane, autoclaved & cleaned | 5 | 5 |

EXAMPLE 3

Coating of Platinum Cured Silicones, Crosslinked Coating

A 20:5:75 mole % AM:3-trimethoxysilylpropylmethacrylate (TMSPM): MPC polymer was synthesised by free radical polymerisation. MPC (21.3686 g) was dissolved in 100 ml ethanol. 3-Trimethoxysilylpropyl methacrylate (TMSPM) (1.1976 g) and AM (2.4338 g) were dissolved in 25 ml ethanol. AIBN (0.05 g) was dissolved in 25 ml of ethanol. The monomers were added together in a 3-necked round bottom flask fitted with condenser and nitrogen inlet. A further 100 ml of ethanol was used to wash any excess reagents into the reaction flask. The mixture was de-oxygenated for 30 minutes by bubbling a stream of nitrogen through the mixture while stirring. The initiator was charged to the reaction vessel and the temperature increased to 65° C. The reaction was performed under a nitrogen atmosphere and allowed to proceed for 72 hours.

Precipitation

The ethanol was removed on a rotary evaporator at 30° C. Dichloromethane/MeOH (70/30) was added to dissolve the solid polymer and the resulting solution added dropwise to 3000 ml acetone which was stirring. The white precipitate was filtered under nitrogen and dried in a vacuum oven at room temperature for 72 hours.

The resulting polymer gave a yield of approximately 70%.

The $^1$H NMR spectrum showed the presence of allylic and trimethoxysilyl groups.

The copolymer was applied to the inner surface of a PET mould liner by dip coating from ethanol (polymer concentration 10 mg/ml). A liquid silicone rubber formulation (Applied Silicone Corporation 40072) was poured into the coated mould. The mould was then closed and cured at 150° C. for 30 minutes wherein the silicone is cured and, it is believed, the coating cross-links. The resulting silicone membranes were removed from the moulds and rinsed in deionised water. The surface of the membranes was more wettable and lubricious than membranes made from the same silicone rubber formulation using uncoated PET moulds.

The membranes were sterilised at 121° C. for 30 minutes in a borate buffered saline and then cleaned using a marketed contact lens cleaner (MiraFlow). The wettability of the coated membranes (evaluated as for Example 1) remained high compared to the uncoated membrane and the lubricity was maintained.

EXAMPLE 4
Coating of Platinum Cured Silicones, Crosslinked Coating

The copolymer synthesised in example 3 was applied to the inner surface of a PET mould liner by dip coating from ethanol (polymer concentration 10 mg/ml). A liquid silicone rubber formulation (Applied Silicone Corporation LSR70) was poured into the coated mould. The mould was then closed and cured at 150° C. under pressure of 1 tonne for 30 minutes. The resulting silicone membranes were removed from the moulds and rinsed in deionised water. The membranes were sterilised at 121° C. for 30 minutes in a phosphate buffered saline. The membranes were highly wettable and lubriious.

EXAMPLE 5
UV Cure of Acrylic Lenses

A model silicone lens formulation was prepared from 60% w/w of a polydimethylsiloxane end capped with methacrylate functionality (Shin Etsu X-22-164B), (PDMS-MA) 25% w/w of methyl methacrylate and 15% w/w of butyl acrylate. Polypropylene lens moulds (the female moulds producing the convex surface were subjected to an air plasma at 100W for 30 s to increase adhesion and wettability) were dip coated from a 2.5% w/w solution of the allyl methacrylate-MPC copolymer from example 1 in ethanol and allowed to dry. They were then filled with the formulation which had 1% by weight of benzoin methyl ether (BME) as initiator.

The moulds were closed and subjected to ultra violet irradiation (Blak Ray long wavelength UV lamp model B100 AP, from UVP Upland CA) for 1 hour. After demoulding, the lenses were extracted in isopropylalcohol and then borate buffered saline. The lenses were highly wettable and lubricious even after autoclaving in borate buffered saline at 121° C. followed by cleaning with Miraflow contact lens cleaner.

ESCA analysis at a take off angle of 35° confirmed the presence of N and P characteristic of the PC coating after autoclaving and cleaning (representative data shown in Table 3 below for two areas from one lens). N and P levels were equivalent as expected for the PC headgroup. The values from the two areas shows good uniformity for the coating. There was no significant difference between concave and convex sides.

TABLE 3

| Sample | Surface | Area | C | O | N | P | Si |
|---|---|---|---|---|---|---|---|
| coated silicone lens | convex | 1 | 58.4 | 25 | 1.2 | 1.1 | 14.4 |
| coated silicone lens | convex | 2 | 58.1 | 24.9 | 1.1 | 1.4 | 14.5 |
| coated silicone lens | concave | 1 | 57.4 | 25.2 | 1 | 1 | 15.4 |
| coated silicone lens | concave | 2 | 58.7 | 24.7 | 1.1 | 1 | 14.4 |

EXAMPLE 6
UV Cure of Acrylic Lenses with Additional Initiator

Example 5 was repeated except that the coating solution for the moulds additionally contained 1% w/w (based on polymer) of BME.

The moulds were closed and subjected to ultra violet irradiation as in example 5 for 1 hour. After demoulding, the lenses were extracted in isopropylalcohol and then borate buffered saline. The lenses were highly wettable and lubricious even after autoclaving in borate buffered saline at 121° C. followed by cleaning with Miraflow contact lens cleaner.

ESCA analysis at a take off angle of 35° confirmed the presence of N and P characteristic of the PC coating after autoclaving and cleaning (representative data shown below for one lens).

TABLE 4

| Sample | Surface | Area | C | O | N | P | Si |
|---|---|---|---|---|---|---|---|
| coated silicone lens | convex | 1 | 57.3 | 26.5 | 2.9 | 2.9 | 10.3 |
| coated silicone lens | convex | 2 | 56.4 | 26.4 | 3.1 | 2.8 | 11.3 |
| coated silicone lens | concave | 1 | 57.3 | 25.6 | 1.4 | 1.4 | 14.4 |
| coated silicone lens | concave | 2 | 56.4 | 25.6 | 1.3 | 1.5 | 15.3 |

By comparison the N and P values with those of Example 5, at the same take off angle, this example shows that coating thickness can be increased by addition of additional photoinitiator to the coating. For this type of composition, plasma pretreatment seems to result in a thickness differential.

The sample depth analysed in the ESCA is about 6 μm. These results indicate that the coatings are thinner than this since the N and P values for pure coating polymer is around 5%. The thickness of the coating on the convex side is about 4 μm and on the concave side about 2 μm. Coating thicknesses of 1–10 μm on the product are preferred.

Comparative Example 1

A 2:1 (mole) copolymer of MPC and butyl methacrylate was prepared by the following method. MPC (12.125 g) was dissolved in ethanol (150 ml) then butyl methacrylate (2.91 g), and AIBN (0.0289 g) were added with stirring. Nitrogen was passed through the solution for 15 minutes then the solution was heated to 60° C. for 24 hours, under a positive pressure of nitrogen. On cooling, the copolymer was precipitated in acetone and dried.

The copolymer was applied to PET mould liners by dip coating from a 10 mg/ml ethanol solution. A liquid silicone rubber formulation (Applied Silicone Corporation 40072) was poured into the coated mould. The mould was then closed and cured at 80° C. for 14 hours. The resulting silicone membranes were removed from the moulds and rinsed in deionised water. The surface of the membranes was more wettable (by the retraction test) than a membrane made from the same silicone rubber formulation using uncoated PET moulds. The wettability was however not as high as for the allyl methacrylate copolymer. The advancing angle of the membrane coated from the butylmethacrylate copolymer was virtually identical to that of the uncoated membrane.

The membranes were sterilised at 121° for 30 minutes in a borate buffered saline and then cleaned using a commercial contact lens cleaner (MiraFlow).

Wettability and lubricity were evaluated as in example 1 and also by Dynamic Contact Angle analysis as for example 1 above. The results are shown in table 5.

TABLE 5

| | Surface Properties | | | |
|---|---|---|---|---|
| Sample | Wettability (retraction test) | Lubricity (blocking) | Advancing contact angle (°) | Receding contact angle (°) |
| Uncoated membrane | 1 | 1 | 88 | 34 |
| Uncoated membrane, autoclaved & cleaned | 1 | 2 | 101 | 61 |
| MPC-butyl-methacrylate coated membrane | 3 | 1 | 105 | 50 |
| MPC-butyl-methacrylate coated membrane, autoclaved & cleaned | 3 | 1 | 105 | 60 |

ESCA analysis of the sample after autoclaving and cleaning showed the absence of phosphorus and nitrogen.

EXAMPLE 7
Generic Synthetic Method for Polymer Preparations

A solution of the required mixture of monomers was made up, usually in an alcohol or mixture containing alcohol in order to solubilise the MPC. The initiator (Perkadox P6) was made up in a separate solution, usually an acetate ester solvent. Dependent upon the scale (<100 g polymer), these solutions could be combined and pumped as a single feed into a monomer starved polymerisation vessel.

A 250 ml three neck flask was fitted with a mechanical overhead stirrer, condenser, thermometer and nitrogen inlet. The flask was charged with 60 ml of an appropriate solvent or combination of solvents and brought to reflux. The monomer/initiator solution was fed into this reaction mixture over a 2–3 hour period. Initiator choice was based on a half-life of 10–60 minutes at the reaction temperature being used. A final polymer concentration of 25% w/v was desirable in order to facilitate the precipitation stage.

After complete addition of monomers, the temperature was held (at 60–63° C.) for a further hour and then the mixture spiked with additional initiator to minimise free monomer levels in the final polymer. The temperature was held for a further 2 hours before removing the heat and preparing for precipitation.

A 1 liter precipitation vessel was fitted with an overhead stirrer and charged with an initial volume (normally~15% of the total precipitation solvent) of a 9:1 non-solvent:solvent mixture (usually acetone:alcohol). Into this was pumped the warm polymer solution through an in-line sintered glass filter and simultaneously in an additional feed, further precipitation solvent. After complete addition of polymer solution and non-solvent, the precipitated material was allowed to settle before the supernatant liquor was removed using a vacuum probe. The polymer mass was redissolved in further solvent with slight warming to aid dissolution. The solution was then pumped to a second precipitation vessel and the process repeated. The final polymer was washed with non-solvent, filtered and dried in a vacuum oven for a minimum of 16 hours.

The monomers and their ratios are shown in Table 6.

CM is choline methacrylate

PDMSMM is monomethacryloylated polydimethyl siloxane having a molecular weight of about 2500

PEGM monomethoxy polyethylene glycol methacrylate of which the PEG has molecular weight of about 550

FDM is 1,1,2,2(4H) heptadecafluorodecylmethacrylate

NNDMA is N,N-dimethylacrylamide

BM is butylmethacrylate

HPMA is 3-hydroxypropylmethacrylate

IPA is isopropyl alcohol

EtOH is ethanol

EtOAc is ethyl acetate

DM is dodecylmethacrylate and

GM is glycidyl methacrylate

TABLE 6

| Example # | Polymer Formula (wt %) | Reaction Solvent System |
|---|---|---|
| 7.1 | $MPC_{90}AM_{10}$ | EtOH:EtOAc (7:5) |
| 7.2 | $MPC_{95}AM_{5}$ | EtOH:EtOAc (7:5) |
| 7.3 | $MPC_{97.5}AM_{2.5}$ | EtOH:EtOAc (7:5) |
| 7.4 | $MPC_{54}MMA_{36}AM_{10}$ | EtOH:EtOAc (7:5) |
| 7.5 | $MPC_{54}PEGM_{36}AM_{10}$ | EtOH:EtOAc (7:5) |
| 7.6 | $MPC_{80}TMSPM_{4}AM_{15}$ | EtOH:EtOAc (7:5) |
| 7.7 | $MPC_{75}TMSPM_{5}HPMA_{5}AM_{15}$ | EtOH:EtOAc (7:5) |
| 7.8 | $MPC_{33}MMA_{52}AM_{15}$ | EtOH:EtOAc (7:5) |
| 7.9 | $MPC_{55}MMA_{35}AM_{10}$ | IPA:EtOAc (7:5) |
| 7.10 | $MPC_{55}FDM_{35}AM_{10}$ | IPA:EtOAc (7:5) |
| 7.11 | $MPC_{55}PDMSMM_{35}AM_{10}$ | IPA:EtOAc (7:5) |
| 7.12 | $MPC_{25}NNDMA_{50}HPMA_{15}AM_{10}$ | IPA:EtOAc (7:5) |
| 7.13 | $MPC_{25}NNDMA_{30}BM_{20}HPMA_{15}AM_{10}$ | IPA:EtOAc (7:5) |
| 7.14 | $MPC_{25}NNDMA_{25}BM_{20}HPMA_{15}TMSPM_{5}AM_{10}$ | IPA:EtOAc (7:5) |
| 7.15 | $MPC_{35}NNDMA_{20}BM_{20}HPMA_{15}AM_{10}$ | IPA:EtOAc (7:5) |
| 7.16 | $MPC_{25}HPMA_{15}AM_{10}$ | EtOH:EtOAc (6:1) |
| 7.17 | $MPC_{25}CM_{10}NNDMA_{20}BM_{20}HPMA_{15}AM_{10}$ | IPA |
| 7.18 | $CM_{35}NNDMA_{20}BM_{20}HPMA_{15}AM_{10}$ | EtOH |
| 7.19 | $MBC_{80}DM_{40}GM_{10}AM_{10}$ | IPA:EtOAc (7:5) |
| 7.20 | $MPC_{55}DM_{35}AM_{10}$ | EtOH:EtOAc (7:5) |

Examples 7.6, 7.7, 7.14 and 7.19 are examples of novel cross-linkable polymers according to the third aspect of the invention.

EXAMPLE 8

Coating a Silicone Hydrogel with Higher Alkyl Methacrylate: Allyl Methacrylate: MPC Terpolymer Preparation of bulk monomer formulation:

The components in Table 7 below were mixed together and stirred until a clear solution was obtained. The formulation was then de-gassed by bubbling nitrogen through the formulation for 5–10 minutes.

TABLE 7

| Components | % w/w of monomer |
|---|---|
| TRIS | 8.8 |
| PDMSMM | 35.5 |
| NNDMA | 30.1 |
| 2-Ethyl hexyl acrylate | 24.1 |
| Methacrylic Acid | 1.5 |
| Total | 100 |
| BME | 1.0 |
| Hexanol | 29.3 |

TRIS is 3-[tris(trimethylsiloxy)silyl]propyl methacrylate
BME is benzoin methylether (initiator)

Preparation of coating solution:

The coating solution was prepared by dissolving the polymer of example 7.20 in ethanol at a concentration of 25 mg/ml. The initiator (BME: Benzoin Methyl Ether) was added to the solution at a concentration of 2% w/w on polymer. The solution was then passed through a 0.2 µm filter.

Preparation of coated lens:

Both the male and female parts of the polypropylene contact lens mould were dipped into the polymer coating solution for 2–3 seconds. The moulds were removed and allowed to dry in air for approximately 1 hour.

Approximately 40 µL of bulk monomer formulation was placed into the dried polypropylene contact lens mould. The mould was then closed and sealed. The reaction was performed by exposing the contact lens mould to UV radiation (Black Ray Long Wavelength UV Lamp, Model B100AP from UVP Upland CA) for approximately 1 hour. The moulds were opened using a contact lens de-moulder. The lenses were placed into isopropanol (iPA)/Deionised Water (DI) (70/30) for at least 3 hours. Each lens was then detached from the moulds and placed in DI for 2 hours, the DI water was replaced once for a further 2 hours. The lenses were then placed into vials containing Borate Buffered Solution saline and autoclaved at 121° C. for 30 minutes.

Results a) The resulting coated lenses were optically clear. The coating did not therefore have any observable effect on the optical properties of the lens.
b) From the DCA results it was found that the surface of the lens is much more wettable than an identical uncoated silicone hydrogel. The table below summarises the results from the DCA experiments. The hysteresis is also significantly reduced for the coated lens compared to the uncoated lens. This shows that the IMC process is a suitable method with which to impart a phosphorylcholine-containing coating onto the surface of a silicone hydrogel.
c) The surface lubricity of the coated lens was much better than that for the uncoated lens.

TABLE 9

| Sample | Lubricity (blocking) |
| --- | --- |
| Coated lens | 1–2 |
| Uncoated lens | 5 | d) ESCA confirmed the presence of nitrogen and phosphorus which are characteristic of the phosphorylcholine-containing coating on the surface of the coated lens.

TABLE 10

| Area | Carbon | Oxygen | Silicone | Nitrogen | Phosphorous |
| --- | --- | --- | --- | --- | --- |
| 1 | 55.6 | 24 | 19.8 | 0.2 | 0.3 |
| 2 | 57 | 23.6 | 17.2 | 0.4 | 0.4 |

EXAMPLE 9

Silicone Hydrogel with Fluoroalkyl Group-containing Polymer

Example 8 was repeated but using the polymer of Example 7.10 in the coating solution in place of the polymer of 7.20

Results a) The resulting coated lenses were optically clear. The coating did not therefore have any observable effect on the optical properties of the lens.
b) From the DCA results it was found that the surface of the lens is much more wettable than an identical uncoated silicone hydrogel. The table below summarises the results from the DCA experiments. The hysteresis is also significantly reduced for the coated lens compared to the uncoated lens. This shows that the IMC process is a suitable method with which to impart a phosorylcholine containing coating onto the surface of silicone hydrogel.

TABLE 8

Dynamic Contact Angles Data

| | Cycle 1 | | Cycle 2 | | Cycle 3 | | Average | | |
| --- | --- | --- | --- | --- | --- | --- | --- | --- | --- |
| Coating | Adv | Rec | Adv | Rec | Adv | Rec | Adv | Rec | Hysteresis |
| Coated | 78.72 | 58.74 | 67.66 | 60.25 | 67.65 | 60.73 | 71.34 | 59.91 | 11.44 |
| | 75.01 | 55.23 | 54.05 | 52.66 | 50.42 | 51.55 | 59.83 | 53.15 | 6.68 |
| | 60.28 | 56.28 | 54.11 | 58.35 | 52.83 | 55.69 | 55.74 | 56.77 | −1.03 |
| | | | | | | | 62.30 | 56.61 | 5.69 |
| Uncoated | 91.96 | 54.7 | 109.51 | 69.97 | 108.68 | 70.62 | 103.38 | 65.10 | 38.29 |
| | 116.35 | 57.35 | 108.08 | 58.1 | 106.68 | 58.23 | 110.37 | 57.89 | 52.48 |
| | 105.32 | 51.63 | 79.63 | 48.99 | 78.24 | 49.4 | 87.73 | 50.01 | 37.72 |
| | | | | | | | 100.49 | 57.67 | 42.83 |

TABLE 11

| Coating | Cycle 1 Adv | Rec | Cycle 2 Adv | Rec | Cycle 3 Adv | Rec | Average Adv | Rec | HYSTERESIS |
|---|---|---|---|---|---|---|---|---|---|
| Coated | 60.14 | 42.86 | 63.28 | 42.02 | 62.88 | 41.82 | 62.10 | 42.23 | 19.87 |
|  | 54.19 | 43.72 | 53.63 | 38.71 | 51.38 | 40.62 | 53.07 | 41.02 | 12.05 |
|  | 70.89 | 51.34 | 68.9 | 51.88 | 65.37 | 50.56 | 68.39 | 51.26 | 17.13 |
|  |  |  |  |  |  |  | 61.18 | 44.84 | 16.35 |
| Uncoated | 91.96 | 54.7 | 109.51 | 69.97 | 108.68 | 70.62 | 103.38 | 65.10 | 38.29 |
|  | 116.35 | 57.35 | 108.08 | 58.1 | 106.68 | 58.23 | 110.37 | 57.89 | 52.48 |
|  | 105.32 | 51.63 | 79.63 | 48.99 | 78.24 | 49.4 | 87.73 | 50.01 | 37.72 |
|  |  |  |  |  |  |  | 100.49 | 57.67 | 42.83 | c) The surface lubricity of the coated lens was much better than that for the uncoated lens.

TABLE 12

| Sample | Lubricity (blocking) |
|---|---|
| Coated lens | 1–2 |
| Uncoated lens | 5 | b) From the DCA results it was found that the surface of the lens is much more wettable than an identical uncoated silicone hydrogel. The table below summarises the results from the DCA experiments. The hysteresis is also significantly reduced for the coated lens compared to the uncoated lens. This shows that the IMC process is a suitable method with which to impart a phosphorylcholine-containing coating onto the surface of silicone hydrogel.

TABLE 14

Dynamic Contact Angles Data

| Coating | Cycle 1 Adv | Rec | Cycle 2 Adv | Rec | Cycle 3 Adv | Rec | Average Adv | Rec | HYSTERESIS |
|---|---|---|---|---|---|---|---|---|---|
| Coated | 67.35 | 59.09 | 68.47 | 58.46 | 66.96 | 58.14 | 67.59 | 58.56 | 9.03 |
|  | 74.24 | 63.81 | 75.52 | 62.64 | 72.4 | 62.92 | 74.05 | 63.12 | 10.93 |
|  | 63.32 | 63.75 | 66.73 | 64.06 | 68.58 | 64.42 | 66.21 | 64.08 | 2.13 |
|  | 77.03 | 61.8 | 63.81 | 61.85 | 65.33 | 61.86 | 69.29 | 61.92 | 7.36 |
| Uncoated | 91.96 | 54.7 | 109.51 | 69.97 | 108.68 | 70.62 | 103.38 | 65.10 | 38.29 |
|  | 116.35 | 57.35 | 108.08 | 58.1 | 106.68 | 58.23 | 110.37 | 57.89 | 52.48 |
|  | 105.32 | 51.63 | 79.63 | 48.99 | 78.24 | 49.4 | 87.73 | 50.01 | 37.72 |
|  |  |  |  |  |  |  | 100.49 | 57.67 | 42.83 | d) ESCA confirmed the presence of nitrogen and phosphorus which are characteristic of the phosphorylcholine containing coating on the surface of the coated lens.

TABLE 13

| Area | Carbon | Oxygen | Silicone | Nitrogen | Phophorous |
|---|---|---|---|---|---|
| 1 | 53.2 | 24.8 | 21.2 | 0.3 | 0.4 | c) The surface lubricity of the coated lens was much better than that for the uncoated lens.

TABLE 15

| Sample | Lubricity (blocking) |
|---|---|
| Coated lens | 1–2 |
| Uncoated lens | 5 | d) ESCA confirmed the presence of nitrogen and phosphorus which are characteristic of the phosphoryicholine containing coating on the surface of the coated lens.

TABLE 16

| Area | Carbon | Oxygen | Silicone | Nitrogen | Phosphorous |
|---|---|---|---|---|---|
| 1 | 58 | 25.1 | 12.5 | 2.3 | 2.1 |
| 2 | 56.7 | 25.2 | 15.2 | 1.4 | 1.4 |

EXAMPLE 10

Silicone Hydrogel with Hydrophobic Silyl Group-containing Polymer

Example 8 was repeated but using the polymer of example 7.11 in place of the polymer of Example 7.20.

Results a) The resulting coated lenses were optically clear. The coating did not therefore have any observable effect on the optical properties of the lens.

EXAMPLE 11

Pretreating Lens Mould Surface

Example 8 was repeated but using the polymer of example 1 in place of polymer of example 7.20. For this example the polypropylene mould pieces were pretreated with plasma for 30 s in oxygen at 100 w with the gas flow at mark 4 in a Bio-rad RF-plasma barrel-etcher PT7100 before dipping into the coating composition to improve surface wetting. The method was otherwise the same.

Results a) The resulting coated lenses were optically clear. The coating did not therefore have any observable effect on the optical properties of the lens.

b) From the DCA results it was found that the surface of the lens is much more wettable than an identical uncoated silicone hydrogel. The table below summarises the results from the DCA experiments. The hysteresis is also significantly reduced for the coated lens compared to the uncoated lens. This shows that the IMC process is a suitable method with which to impart a phosphorylcholine-containing coating onto the surface of a silicone hydrogel.

TABLE 17

Dynamic Contact Angles Data

| Coating | Cycle 1 Adv | Cycle 1 Rec | Cycle 2 Adv | Cycle 2 Rec | Cycle 3 Adv | Cycle 3 Rec | Average Adv | Average Rec | HYSTERESIS |
|---|---|---|---|---|---|---|---|---|---|
| Yes | 64.22 | 29.52 | 45.74 | 34.1 | 49.81 | 34.62 | 53.26 | 32.75 | 20.51 |
|  | 64.25 | 32.84 | 63.57 | 34.12 | 58.41 | 30.97 | 62.08 | 32.64 | 29.43 |
|  | 70.59 | 56.3 | 66.9 | 44.94 | 66.18 | 45.08 | 67.89 | 48.77 | 19.12 |
|  |  |  |  |  |  |  | 61.07 | 38.05 | 23.02 |
| Uncoated | 91.96 | 54.7 | 109.51 | 69.97 | 108.68 | 70.62 | 103.38 | 65.10 | 38.29 |
|  | 116.35 | 57.35 | 108.08 | 58.1 | 106.68 | 58.23 | 110.37 | 57.89 | 52.48 |
|  | 105.32 | 51.63 | 79.63 | 48.99 | 78.24 | 49.4 | 87.73 | 50.01 | 37.72 |
|  |  |  |  |  |  |  | 100.49 | 57.67 | 42.83 | c) The surface lubricity of the coated lens was much better than that for the uncoated lens.

TABLE 18

| Sample | Lubricity (blocking) |
|---|---|
| Coated lens | 1 |
| Uncoated lens | 5 | d) ESCA confirmed the presence of nitrogen and phosphorus which are characteristic of the phosphorylcholine containing coating on the surface of the coated lens.

TABLE 19

| Area | Carbon | Oxygen | Silicone | Nitrogen | Phosphorous |
|---|---|---|---|---|---|
| 1 | 59.7 | 23.4 | 13.5 | 2.5 | 0.9 |
| 2 | 58.7 | 22.9 | 15.5 | 2.5 | 0.5 |

EXAMPLE 12

Preparation of a Polymer in which the Graftable Functionality is Reacted Onto the Preformed-polymer.

A polymer of formula MPC:2-(t-butyl)aminoethyl methacrylate 75:25 was made according to the general procedure outlined in example 7 in a solvent of isopropylalcohol ethylacetate (4.5:1) using 2,2-azobis(isobutyronitrile) as the initiator at a polymerisation temperature of about 89–90° C. After the polymerisation was complete, the reaction mixture was cooled and m-3-isopropenyl-αα-dimethylbenzyl isocyanate was added in order to react with all 2° amine groups available on the alkyl amino pendant groups. Complete addition of isocyanate to amine was confirmed by FT-IR. The solution was returned to reflux for 1 hour, then cooled before precipitation.

The polymer has a pendant ethylenically unsaturated group suitable for use in a process similar to that of example 5 or 8, to coat a mould used to polymerise ethylenically unsaturated bulk monomer mixtures.

EXAMPLE 13

PC-containing-bulk Monomer

Preparation of bulk monomer formulation:

The components in table 20 below were mixed together and stirred until a clear solution was obtained. The formulation was then de-gassed by bubbling nitrogen through the formulation for 5–10 minutes.

TABLE 20

| Components | % w/w of monomer |
|---|---|
| HEMA | 84.7 |
| EGDMA | 0.7 |
| MPC | 14.6 |
| MBE | 0.4622 |

EGDMA is ethyleneglycol dimethacrylate.

Preparation of coating solution:

The coating solution was prepared by dissolving the coating polymer (Example 1, 7.10 or 7.11) in ethanol at a concentration of 25 mg/ml. The initiator (BME: Benzoin Methyl Ether) was added to the solution at a concentration of 2% w/w on polymer. The solution was then passed through a 0.2 µm filter.

For the polymer of example 1, both male and female parts of the polypropylene contact lens mould were plasma treated (Conditions: 30 seconds, Oxygen, 100 Watts, Gas Flow=4), prior to coating.

The lenses were coated, dried, filled and cured as in example 8 above. The product lenses were then assessed.

Results a) All the resulting coated lenses were optically clear. The coatings did not therefore have any observable effect on the optical properties of the lenses.

b) From the wettability study it was found that the surface of all of the coated lenses were even more wettable (score 1) than an identical uncoated lens (score 3).

EXAMPLE 14
pHEMA Hydrogel

Example 13 was repeated but using as the bulk monomer solution a mixture of 99.34% by weight 2-hydroxyethyl methacrylate (HEMA) and 0.66% by weight ethyleneglycoldimethacrylate.

Results a) The resulting coated lenses were optically clear. The coating did not therefore have any observable effect on the optical properties of the lens.
b) From the wettability study it was found that the surface, all three of the coated lenses are more wettable than an identical uncoated lens. The table below summarises the results from the wettability experiments. This shows that the process is a suitable method with which to impart a phosphorylcholine containing coating onto the surface of pHEMA hydrogel.

TABLE 21

| Sample | Score of Break-up time |
| --- | --- |
| Un-coated pHEMA lens | 3 |
| Example 1 coating | 1 |
| Example 7.20 coating | 1 |
| Example 7.10 coating | 1 | c) The surface lubricity of the coated lens was much better than that for the uncoated lens.

TABLE 22

| Sample | Lubricity (blocking) |
| --- | --- |
| Uncoated pHEMA lens | 3 |
| Example 1 coating | 1 |
| Example 7.20 coating | 1 |
| Example 7.10 coating | 1 |

EXAMPLE 15
Monomer in Coating Solution

Example 8 was repeated using the same bulk monomer composition and coating polymer with the difference being that HEMA was added to the coating solution, at a concentration of 30% by weight based upon the polymer weight. Drying of the coating and polymerisation of the bulk proceeded in the same manner.

The product surface and clarity characteristics were assessed and found to be equivalent to those of the product of Example 8. It is assumed that the concentration of phosphorylcholine groups at the surface will be lower by virtue of the incorporation of HEMA, which is assumed to polymerise in the surface coating. However the coating still has desirable characteristics.

EXAMPLE 16
Cross-linkable Coating Polymer

The components in Table 23 below were mixed to make the bulk monomer solution. Polypropylene lens moulds were plasma treated as in Example 11 and then coated with 0.2 μm filtered 25 mg/ml solution of the coating polymer (MPC:TMSPM:AM 80:5:15 made by a process analogous to that of Example 7.6) in ethanol, containing 2% w/w (based on polymer) BME. The coated moulds were allowed to dry at ambient conditions for about 1 hour. Some of the coated moulds were then placed in a vacuum oven for 2 hours at 80° C. to crosslink the trimethoxysilyl groups. The bulk monomer solution was then used to fill the moulds and was cured using the same general technique as Example 8. The surface and optical characteristics product lenses were assessed.

TABLE 23

| Components | % w/w of monomer |
| --- | --- |
| TRIS | 57.9 |
| Hema | 10.1 |
| NNDma | 29.4 |
| Ethylene glycol dimethacrylate | 2.6 |
| Total | 100 |
| BME | 1.1 |

The uncoated lenses were very hydrophobic (wettability score 5). The pre-crosslinked coatings were much more wettable, scoring 2-3. Lubricity was likewise reduced from 5 to 2-3.

EXAMPLE 17
Partially Curing Coating Polymer Before Filling Mould with Monomer The components in table 24 were mixed to form the bulk monomer solution. The coating solution consisted of a solution of 50 mg/ml product of Example 1, 1% w/w (based on polymer) BME and a surfactant (S-100, Ciba Vision) at a rate of 2–3 drops per 20 ml (to improve mould surface wetting) in ethanol. The lens moulds were plasma treated as in Example 8 and the dipped into the coating solution. After allowing the coating to dry in air, some of the coated lenses were subjected to a partial curing step by exposure to UV for 15 min, using the same lamp as for the monomer curing. Subsequent filling, curing and lens recovery steps were carried out as in Example 8.

TABLE 24

| Components | % w/w of monomer |
| --- | --- |
| TRIS | 57.9 |
| HEMA | 10.1 |
| NNDMA | 29.4 |
| EGDMA | 2.6 |
| Total | 100 |
| BME | 1.1 |

The product lenses of which the coating had been subjected to the partial cure prior to filling the mould with bulk monomer had better shape retention than those on which no partial curing was carried out. The lubricity and wettability values for the lens was reduced by the partial cure coating from 5 to 1 in each case.

What is claimed is:

1. A method for producing a coated molded polymer article including the steps:
   a) providing a polymer A formed by radical polymerization of ethylenically unsaturated monomers which include
      i) a zwitterionic monomer of the general formula I $$Y-B-X \qquad (I)$$

wherein B is a straight or branched alkylene, oxaalkylene or oligo-oxaalkylene chain optionally containing one or more fluorine atoms up to and including perfluorinated chains or, if X or Y contains a terminal carbon atom bonded to B, a valence bond;
   X is a zwitterionic group and
   Y is an ethylenically unsaturated polymerizable group selected from the group consisting of

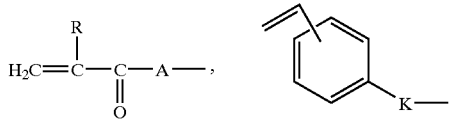

CH$_2$=C(R)—CH$_2$—O—, CH$_2$=C(R)—CH$_2$OC(O)—, CH$_2$=C(R)OC(O)—, CH$_2$=C(R)—O—, CH$_2$=C(R)CH$_2$OC(O)N(R$^1$)—, R$^{30}$OOCCR=CRC(O)—O—, RCH=CHC(O)O—, RCH=C(COOR$^{30}$)CH$_2$—C(O)—O—,

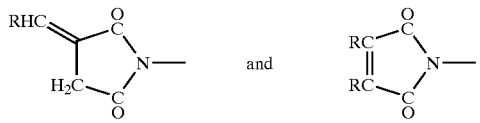 and wherein:
R is hydrogen or a C$_1$–C$_4$ alkyl group;
R$^{30}$ is hydrogen or a C$_{1-4}$ alkyl group; or BX
A is —O— or —NR$^1$—, R$^1$ is hydrogen or a C$_1$–C$_4$ alkyl group or R$^1$ is —B—X where B and X are as defined above; and
K is a group —(CH$_2$)$_p$OC(O)—, —(CH$_2$)$_p$C(O)O—, —(CH$_2$)$_p$OC(O)O—, —(CH$_2$)$_p$NR$^2$—, —(CH$_2$)$_p$NR$^2$C(O)—, —(CH$_2$)$_p$C(O)NR$^2$—, —(CH$_2$)$_p$NR$^2$C(O)O—, —(CH$_2$)$_p$OC(O)NR$^2$—, —(CH$_2$)$_p$NR$^2$C(O)NR$_2$— in which the; groups R$^2$ are the same or different. —(CH$_2$)$_p$O—, —(CH$_2$)$_p$SO$_3$—, or, optionally in combination with B, a valence bond and p is from 1 to 12 and R$^2$ is hydrogen or a C$_1$–C$_4$ alkyl group and ii) a reactive functional monomer of the formula II

Y$^1$B$^4$R$^3$      II wherein
B$^4$ is a straight or branched alkylene, oxaalkylene or oligo-oxaalkylene chain optionally containing one or more fluorine atoms up to and including perfluorinated chains, or a valence bond;
Y$^1$ is an ethylenically unsaturated polymerizable group selected from the group consisting of

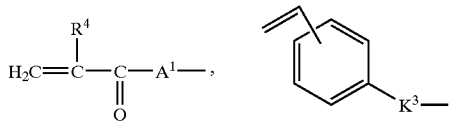

CH$_2$=C(R$^4$)—CH$_2$—O—, CH$_2$=C(R$^4$)—CH$_2$OC(O)—, CH$_2$=C(R$^4$)OC(O)—, CH$_2$=C(R$^4$)—O—, CH$_2$=C(R$^4$)CH$_2$OC(O)N(R$^5$)—, R$^{31}$OOCCR$^4$=CR$^4$C(O)—O—, R$^4$H=CHC(O)—O—, R$^4$H=C(COOR$^{31}$)CH$_2$C(O)O—

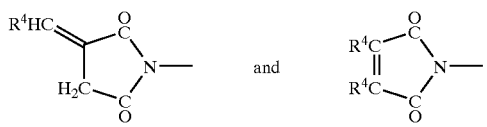 and where
R$^4$ is hydrogen or C$_{1-4}$ alkyl;
R$^{31}$ is hydrogen, a C$_{1-4}$ alkyl group or a group B$^4$R$^3$;
A$^1$ is —O— or —NR$^5$—; R$^5$ is hydrogen or a C$_1$–C$_4$ alkyl group or R$^5$ is a group B$^4$R$^3$;

K$^1$ is a group —(CH$_2$)$_1$OC(O)—, (CH)1C(O)O—, —(CH$_2$)$_1$OC(O)O—, —(CH$_2$)$_1$NR$^6$—, —(CH$_2$)$_1$NR$^6$C(O)—, —(CH$_2$)$_1$C(O)NR$^6$—, —(CH$_2$)$_1$NR$^6$C(O)O—, —(CH$_2$)$_1$OC(O)NR$^6$—, —(CH$^2$), NR$^6$C(O)NR$^6$— in which the groups R$^6$ are the same or different, —(CH$_2$)$_1$O—, —(CH$_2$)$_1$SO$_3$—, or a valence bond and 1 is from 1 to 12 and R$^6$ is hydrogen or a C$_1$–C$_4$ alkyl group;
and R$^3$ is a pendant reactive group which is an ethylenically unsaturated group;

b) providing a mold, molding surfaces of which are substantially free of surface functional groups capable of reacting to form covalent bonds with said pendant reactive groups of polymer A;

c) providing at least a portion of the surface of the mold with a coating of polymer d) providing a liquid curable composition comprising a functional compound reactive with the reactive groups of polymer A, e) contacting said liquid curable composition with the mold whereby the composition is in contact with the coated portions of the mold surface, and f) curing the curable composition to form bulk polymer B under conditions such that reaction takes place between said functional compound and the reactive groups of polymer A to form a covalent bond linking polymer A to polymer B at least at the interface between the coating and bulk polymer B, g) and demolding the bulk polymer B with polymer A coating.

2. A method according to claim 1 in which groups X are pendant groups from the backbone of polymer A.

3. A method according to claim 1 or claim 2 in which in groups X, the atom bearing an anionic charge and the atom bearing a cationic charge are separated by 2 to 12 atoms.

4. A method according to claim 3, in which the cation is further from the polymer backbone than from the anion.

5. A method according to claim 1 in which the cationic group is a quaternary ammonium group.

6. A method according to claim 1 in which the anionic group is a phosphate diester group.

7. A method according to claim 1 in which X is of formula VI

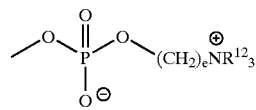    VI where the groups R$^{12}$ are the same or different and each is hydrogen or C$_{1-4}$ alkyl, and e is from 1 to 4.

8. A method according to claim 1 in which R$^3$ is selected from the group consisting of ethylenically and acetyllenically unsaturated group containing radicals; aldehyde groups; silane and siloxane groups containing one or more substituents selected from halogen atoms and C$_{1-4}$-alkoxy groups; hydroxyl; amino; carboxyl; epoxy; —CHOHCH$_2$Hal in which Hal is selected from the group consisting of chlorine, bromine and iodine atoms; succinimido; tosylate; triflate; imidazole carbonyl amino; optionally substituted triazine groups; acetoxy; mesylate; carbonyl di(cyclo)alkyl carbodiimidoyl; isocyanate, acetoacetoxy; and oximino.

9. A method according to claim 1 in which step a) comprises the step of polymerizing ethylenically unsaturated monomers under radical polymerization conditions to form a substantially non-cross-linked polymer A, under conditions such that ethylenically unsaturated groups $R^3$ do not polymerize to any significant degree.

10. A method according to claim 1 in which the curable composition comprises ethylenically unsaturated monomers and/or pre-polymer and the curing involves radical polymerization of the ethylenically unsaturated polymerizable groups.

11. A method according to claim 1 in which the curable composition comprises siloxane prepolymers and the polymer B is a platinum-cured polysiloxane.

12. A method for producing a coated molded polymer article including the steps:
  a) providing a polymer $A^1$ which is a substantially non-crosslinked polymer having pendant zwitterionic groups and pendant reactive groups said polymer A' being formed from ethylenically unsaturated monomers including zwitterionic monomer with zwitterionic group X and monomer of the general formula IX $$Y^1B^4R^{15} \qquad \text{IX}$$

where $B^4$ is a straight or branched alkylene, oxaalkylene or oligo-oxaalkylene chain optionally containing one or more fluorine atoms up to and including perfluorinated chains, or a valence bond;
$Y^1$ is an ethylenically unsaturated polymerizable group selected from the group consisting of

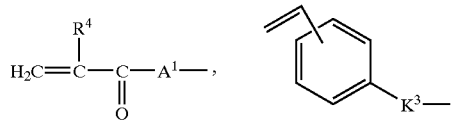

$CH_2$=$C(R^4)$—$CH_2$—O—, $CH_2$=$C(R^4)$—$CH_2OC(O)$—, $CH_2$=$C(R^4)OC(O)$—, $CH_2$=$C(R^4)$—O—, $CH_2$=$C(R^4)CH_2OC(O)N(R^5)$—, $R^{31}OOCCR^4$=$CR^4C(O)$—O—, $R^4H$=$CHC(O)$—O—, $R^4H$=$C(COOR^{31})CH_2C(O)O$—

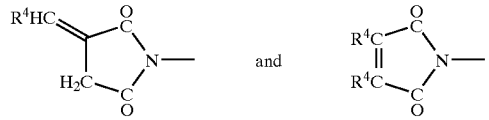

and where
  $R^4$ is hydrogen or $C_1$-$C_4$ alkyl;
  $R^{31}$ is hydrogen, a $C_{1-4}$ alkyl; group or a group $B^4R^3$;
  $A^1$ is —O— or —$NR^5$—; $R^5$ is hydrogen or a $C_1$-$C_4$ alkyl group or $R^5$ is a group $B^4R^{15}$;
  $K^1$ is a group —$(CH_2)_1OC(O)$—, —$(CH)_1C(O)O$—, —$(CH_2)_1OC(O)O$—, —$(CH_2)_1NR^6$—, —$(CH_2)_1NR^6C(O)$—, —$(CH_2)_1C(O)NR^6$—, —$(CH_2)_1NR^6C(O)O$—, —$(CH_2)_1OC(O)NR^6$—, —$(CH_2)_1NR^6C(O)NR^6$— in which the groups $R^{16}$ are the same or different, —$(CH_2)_1O$—, —$(CH_2)_1SO_3$—, or a valence bond and 1 is from 1 to 12 and $R^6$ is hydrogen or a $C_1$-$C_4$ alkyl group; and
  $R^{15}$ is a reactive group and comprises an ethylenically unsaturated group, provided that $R^{15}$ is not the same as $Y^1$, b) providing a mold,
  c) providing at least a portion of the surface of the mold with a coating of polymer A',
  d) providing a liquid curable composition comprising a functional compound reactive with said reactive groups of polymer A',
  e) contacting the liquid curable composition with the mold whereby the composition is in contact with the coated portions of the mold surface;
  f) curing the curable composition to form bulk polymer B under conditions such that reaction takes place between said functional compound and the reactive groups of polymer A' to form a covalent bond linking polymer A' to polymer B at least at the interface between the coating and bulk polymer B; and
  g) demolding the coated polymer product.

13. A method according to claim 12 in which the curable composition comprises siloxane monomers and the polymer B is a polysiloxane.

14. A method according to claim 12 in which the curable composition comprises ethylenically unsaturated monomers and step f) involves radical polymerization of the ethylenically unsaturated polymerizable $R^{15}$ groups and said monomers.

15. A method according to claim 14 in which step a) comprises the step of polymerizing the ethylenically unsaturated monomers under radical polymerization conditions to form non-cross-linked polymer A, under conditions such that ethylenically unsaturated groups R15 do not polymerize to any significant degree.

16. A method according to claim 3 in which in groups X, the atom bearing an atomic charge and the atom bearing a cationic charge are separated by 2 to 8 atoms.

17. A method according to claim 16 in which in group X, the atom bearing an atomic charge and the atom bearing a cationic charge are separated by 2 to 6 atoms.

18. A method according to claim 1 which the reactive group, $R^3$ is a $CH_2$=CH— group.

19. A method according to claim 17 in which the reactive group is allyl methacrylate.

* * * * *